United States Patent
Ghislain et al.

(10) Patent No.: US 12,372,455 B2
(45) Date of Patent: Jul. 29, 2025

(54) SYSTEMS AND METHODS FOR CHARGED DROPLET DETECTION AND CONTROL

(71) Applicant: Labcyte Inc., San Jose, CA (US)

(72) Inventors: Lucien P. Ghislain, San Jose, CA (US); Wilfredo T. Sagun, San Jose, CA (US); Eunchul Choe, San Jose, CA (US); Richard G. Stearns, Soquel, CA (US)

(73) Assignee: LABCYTE INC., San Jose, CA (US)

( * ) Notice: Subject to any disclaimer, the term of this patent is extended or adjusted under 35 U.S.C. 154(b) by 37 days.

(21) Appl. No.: 18/255,358

(22) PCT Filed: Feb. 25, 2022

(86) PCT No.: PCT/US2022/017988
§ 371 (c)(1),
(2) Date: May 31, 2023

(87) PCT Pub. No.: WO2022/183045
PCT Pub. Date: Sep. 1, 2022

(65) Prior Publication Data
US 2024/0003801 A1    Jan. 4, 2024

Related U.S. Application Data

(60) Provisional application No. 63/154,633, filed on Feb. 26, 2021.

(51) Int. Cl.
*G01N 15/1031* (2024.01)
(52) U.S. Cl.
CPC .................. *G01N 15/1031* (2013.01)
(58) Field of Classification Search
CPC ....... G01N 15/1031; G01N 2015/1406; G01N 15/1404; B01L 3/0268; B01L 2200/143; B01L 2400/0433; H01J 49/0454
(Continued)

(56) References Cited

U.S. PATENT DOCUMENTS 3,060,429 A    10/1962  Winston
5,523,778 A     6/1996  Fickling
(Continued)

FOREIGN PATENT DOCUMENTS

EP    0039772 A1    11/1981
EP    3871773 A1     9/2021
(Continued)

OTHER PUBLICATIONS

PCT/US2023/072761, "International Search Report and Written Opinion", Dec. 20, 2023, 13 pages.
(Continued)

*Primary Examiner* — Christopher P McAndrew
(74) *Attorney, Agent, or Firm* — Kinney & Lange, P.A.

(57) ABSTRACT

System and methods are described herein for detecting positions or trajectories and/or controlling directions of charged droplets during travel. The systems and methods are useful for determining the locations of the charged droplets in real-time based on signals induced in the electrodes of a sensor surrounding an aperture through which the charged droplet passes in flight from the source well to the target. The signals from the sensor electrodes can be measured and used to determine a position or trajectory of the droplet. The systems and methods are useful for modifying trajectories of the charged droplets in real-time, such as based on determined positions identified as having a trajectory deviating from the target. The trajectories can be modified by applying voltages to electrodes surrounding an aperture through which the charged droplet passes in flight from the source well to the target.

20 Claims, 20 Drawing Sheets

(58) Field of Classification Search
 USPC ...................................................... 324/71.1
 See application file for complete search history.

(56) References Cited

U.S. PATENT DOCUMENTS

| | | | | |
|---|---|---|---|---|
| 5,598,200 | A | * | 1/1997 | Gore .................. B22F 9/08 |
| | | | | 347/88 |
| 5,975,683 | A | | 11/1999 | Smith et al. |
| 6,079,814 | A | * | 6/2000 | Lean .................. B41J 2/06 |
| | | | | 850/62 |
| 10,325,768 | B1 | | 6/2019 | Stearns |
| 2006/0152543 | A1 | | 7/2006 | Komatsu et al. |
| 2017/0266728 | A1 | * | 9/2017 | Johnson ............. B22D 23/003 |
| 2019/0262829 | A1 | * | 8/2019 | Umapathi ........... B01F 33/3021 |
| 2020/0185209 | A1 | | 6/2020 | Cui |
| 2021/0121905 | A1 | * | 4/2021 | Covey ................ G01F 13/00 |

FOREIGN PATENT DOCUMENTS

| | | | |
|---|---|---|---|
| JP | 2005081716 | A | 3/2005 |
| JP | 2007073520 | A | 3/2007 |
| JP | 2012216486 | A | 11/2012 |
| JP | 2014198464 | A | 10/2014 |
| JP | 2018001098 | A | 1/2018 |
| WO | 2017161052 | A1 | 9/2017 |
| WO | 2021058699 | A1 | 4/2021 |
| WO | 2022183045 | A1 | 9/2022 |

OTHER PUBLICATIONS

Application No. PCT/US2022/017988, International Search Report and Written Opinion, Mailed on Aug. 9, 2022, 20 pages.
PCT/US2022/017988, "Invitation to Pay Additional Fees and, Where Applicable, Protest Fee", Jun. 17, 2022, 5 pages.
Racke et al., "Detection of Small Bunches of Ions Using Image Charges", Scientific Reports, DOI:10.1038/s41598-018-28167-6, vol. 8, No. 9781, Jun. 28, 2018, pp. 1-10.
Official Action for JP Patent Application No. 2023-551800, dated Sep. 12, 2024, 13 pages.
Official Action for JP Patent Application No. 2023-551800, dated Mar. 5, 2025, 9 pages with translation.

* cited by examiner

1800

```
POSITIONING A CHARGED DROPLET DETECTOR BETWEEN A DROPLET GENERATOR
AND A TARGET
1802
          │
          ▼
DIRECTING A CHARGED DROPLET FROM THE DROPLET GENERATOR TOWARD THE
TARGET THROUGH AN APERTURE OF THE CHARGED DROPLET DETECTOR
1804
          │
          ▼
ANALYZING VOLTAGE SIGNALS GENERATED BY THE CHARGED DROPLET DETECTOR
1806
```

```
POSITIONING A CHARGED DROPLET CONTROLLER BETWEEN A DROPLET GENERATOR
                         AND A TARGET
                             2302
                               │
                               ▼
DIRECTING A CHARGED DROPLET FROM THE DROPLET GENERATOR TOWARD THE
   TARGET THROUGH AN APERTURE OF THE CHARGED DROPLET CONTROLLER
                             2304
                               │
                               ▼
DETERMINING AND APPLYING VOLTAGES TO SEGMENTS OF A CONDUCTIVE LAYER
               OF THE CHARGED DROPLET CONTROLLER
                             2306
```

FIG. 23

SYSTEMS AND METHODS FOR CHARGED DROPLET DETECTION AND CONTROL

CROSS-REFERENCE TO RELATED APPLICATIONS

This application claims the benefit of and priority to U.S. Provisional Application No. 63/154,633, filed on Feb. 26, 2021, which is hereby incorporated by reference in its entirety.

BACKGROUND

The discovery of novel and useful materials, characterization of materials, performing tests, and other such procedures may depend on the ability to make and characterize new compositions of matter. As a result, recent research relating physical, chemical, biological, or other material properties has focused on the development and implementation of methods and systems for synthesizing and evaluating potentially useful Chemical compounds in addition to performing tests on and analyzing various materials. In particular, high-speed combinatorial methods have been developed to address the general need in the art for systematic, efficient, and economical material synthesis techniques as well as methods to analyze and to screen novel materials for useful properties.

High-speed combinatorial methods often involve the use of array technologies that require accurate dispensing of fluids each having a precisely known chemical composition, concentration, stoichiometry, ratio of reagents, and/or volume. Such array technologies may be employed to carry out various synthetic processes and evaluations. Array technologies may employ large numbers of different fluids to form a plurality of reservoirs that, when arranged appropriately, create combinatorial libraries, in order to carry out combinatorial techniques, a number of fluid dispensing techniques have been explored, such as pin spotting, pipetting, inkjet printing, and acoustic ejection.

Many of these techniques possess inherent drawbacks that must be addressed, however, before the fluid dispensing accuracy and efficiency required for the combinatorial methods can be achieved. For instance, a number of fluid dispensing systems are constructed using networks of tubing or other fluid-transporting vessels. Tubing, in particular, can entrap air bubbles, and nozzles may become clogged by lodged particulates. As a result, system failure may occur and cause spurious results. Furthermore, cross-contamination between the reservoirs of compound libraries may occur due to inadequate flushing of tubing and pipette tips between fluid transfer events. Cross-contamination can easily lead to inaccurate and misleading results.

Acoustic ejection provides a number of advantages over other fluid dispensing technologies. In contrast to inkjet devices, nozzle-less or tip-less fluid ejection devices are not subject to clogging and their associated disadvantages, e.g., misdirected fluid or improperly sized droplets. Furthermore, acoustic ejection does not require the use of tubing or involve invasive mechanical actions, for example, those associated with the introduction of a pipette tip into a reservoir of fluid, and may thus, among other things, reduce the risk of contamination. Additionally, acoustic ejection can achieve higher levels of precision and accuracy, and can be used to dispense very small volumes of fluid, which may drastically reduce reagent costs.

Acoustic ejection has been described in a number of patents. For example, U.S. Pat. No. 4,308,547 to Lovelady et al. describes a liquid droplet emitter that utilizes acoustic principles to eject droplets from a body of liquid onto a moving document to result in the formation of characters or barcodes thereon. A nozzle-less inkjet printing apparatus is used such that controlled drops of ink are propelled by an acoustical force produced by a curved transducer at or below the surface of the ink. Similarly. U.S. Pat. No. 6,666,541 describes a device for acoustically ejecting a plurality of fluid droplets toward discrete sites on a substrate surface for deposition thereon. The device includes an acoustic radiation generator that may be used to eject fluid droplets from a reservoir, as well as to produce a detection acoustic wave that is transmitted to the fluid surface of the reservoir to become a reflected acoustic wave. Characteristics of the reflected acoustic radiation may then be analyzed in order to assess the acoustic energy level produced by the acoustic radiation generator at the fluid surface. Thus, acoustic ejection may provide an added advantage in that the proper use of acoustic radiation provides feedback relating to the process of acoustic ejection itself.

Variation of the initial conditions of droplet formation at the meniscus, including droplet speed and direction, in addition to variation of forces on the droplet during its flight path, such as air drag and electrostatic forces on charged droplets, etc. result in variation of droplet placement at the target.

When the target is a destination microplate well and multiple droplets are transferred, it is desirable for all droplets to fuse and coalesce into a single larger droplet at the target. However, in some cases, droplets land at the target in a scattershot pattern.

Many prior solutions rely on a passive approach to minimize sources of variation, Some example techniques "dampen" the meniscus and reduce fluid surface variability, but this has not been a "global" solution. Typical existing solutions involve some type of calibration solution for non-real-time droplet placement verification, which can be a time consuming, manual process. For example, fluid-sensitive paper may be used to determine where droplets have landed after test droplet ejections. Such non-real time processes, in addition to being time consuming and manually intensive, do not allow for timely adjustments and may in some cases result in substantial costs due to droplet ejection failures. Although there are a few existing solutions that can provide real-time verification of droplet placement, these involve the use of large, expensive, and complex machines. For example, certain optical systems, such as phase doppler interferometer systems, can be used to detect droplet position in real time, but these are large, expensive, and typically use laser systems that could be desirably avoided.

There is a need in the art for improved methods and apparatuses that are capable of accurately detecting droplet ejections, droplet velocity, and droplet location during transit that provides real-time data that does not rely on optical lasers that are bulky and expensive.

SUMMARY

Examples of the invention covered by this disclosure are defined by the claims below, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire disclosure, including the below description, all drawings, and each claim.

Though typical systems rely on manual calibration and/or large and expensive optical tracking systems for droplet ejection tracking of acoustic droplet ejectors, the devices, systems, and methods provided herein enable real-time tracking and control of charged droplets with a compact and low-cost system. Although examples described herein may show or be referenced with respect to acoustic droplet ejection systems, the techniques and systems described herein may be applied to pressure-based systems (e.g., inkjet), microfluidic systems, or any other suitable droplet generation systems or components (e.g., fluorescence-activated cell sorters, fluorescence-activated single-droplet dispensers, precision micropump systems, piezoelectric-based active droplet generators, etc.). Although real-time tracking can be achieved using optical tracking systems, such systems may add additional complexity to a droplet ejection system and can impact system usability. Other techniques for non-real-time tracking can require manual calibration and interrupt workflows. The real-time measurements described herein provide for increased manufacturing workflow efficiency and rapid optimization of droplet generator calibration. The real-time control schemes described herein further provide for accuracy and repeatability of droplet position, which can avoid repeated calibration through real-time feedback systems. The systems and methods can also allow for efficient coupling of a droplet generator (e.g., an acoustic droplet ejection system) with an inlet of a secondary device, such as a mass spectrometer or other analytical system. The devices, systems, and methods described herein are particularly useful for real-time tracking and control, for example to validate or align droplet placement in a mass spectrometer or other analytical system during sample placement for analysis.

The present disclosure provides systems for detection, monitoring, and control of charged droplets from droplet generators, such as acoustic droplet ejection systems. One general aspect includes a device for detection and/or control of charged droplets from droplet generators. The device may include a sensor or control element (e.g., a multi-layer printed circuit board) having one or more conductive layers separated or supported by insulating layers, the sensor or control element defining an aperture of the device through which charged droplets pass. In some examples, the sensor or control element may be fabricated as a multi-layer printed circuit board, although one of skill in the art would appreciate that the sensor or control element may take any suitable form. In some embodiments, droplets ejected by a droplet generator may need to arrive at a target within a. particular tolerance. For example, particular applications may impose a placement tolerance, such as within a dimension that is a fraction of the droplet diameter (e.g., within 100%, 75%, 50%, 25%, 10%, or 5% of the droplet diameter). Such a placement tolerance may, for example, ensure that a droplet arrives on target or that different droplets coalesce upon reaching the target. In some cases, droplets may arrive off-target by about 200% or less of the droplet diameter (e.g., 2.5 nL droplets, which have a diameter 168 microns, may arrive 400 microns off target). In a preferred case, droplets consistently land at a target location, or within a distance from the target location that is 125% of the droplet diameter or less, with less than 1 per 1000 droplets landing farther from the target location than 125% of the droplet diameter. After the first droplet, subsequent droplets directed at the target location may desirably fuse, coalesce, and mix into a single larger droplet. In ideal cases, there should be no droplets off-target, no scatter, and no spray landing in isolation from the main droplet. Droplet placement on target may he tolerant to the widest possible range of initial speed and direction at droplet formation as well as fluctuations along the droplet flight path. In some examples, the target may be an inlet or orifice associated with wells in a microplate, microfluidic device, or analytical instrument, device, or system. Droplets may be sized to appropriately reach the target without impacting the sides or walls of the inlet or orifice. For example, the orifice may have a diameter greater than or about 130% of a diameter of the droplet, such as greater than or about 150%, 200%, 250%, 300%, 350%, 400%, 450%, 500%, or from about 130% to about 1000% of a diameter of the droplet.

In some examples, a sensor element may include three or more conductive layers and two or more insulating layers. In an example, an internal layer of the sensor element may include a segmented conductive layer having a plurality of divided segments electrically isolated or independent from one another, the plurality of divided segments arranged about a perimeter of the aperture at the segmented conductive layer. The device may also include a circuit element (e.g., one or more transimpedance amplifiers) electrically coupled to each of 1.5 the divided segments. Each divided segment of the sensor element is positioned to provide an induced current to the circuit element as a charged droplet passes through the aperture. The circuit element may include one or more transimpedance amplifiers that generate measured values (e.g., voltage signals) proportional to the induced current. The device may also include one or more computing devices or means that may receive the measured values from the circuit element and generate a weighting map identifying a position of a charged droplet within the aperture based on a magnitude of the measured values. In some examples, the signals may be processed with a computing device, circuit, an analog-to-digital converter, software, or other such systems.

In some examples, a control element may include one or more conductive layers and one or more insulating layers. In an example, a conductive layer of the control element may include a segmented conductive layer having a plurality of divided segments electrically isolated or independent from one another, the plurality of divided segments arranged about a perimeter of the aperture at the segmented conductive layer. The device may also include one or more voltage generators and/or voltage controllers for applying potentials to each of the divided segments to generate an electric field of an orientation and magnitude sufficient to alter a trajectory of a charged droplet as it passes through the aperture. The device may also include one or more computing devices or means that may determine voltages to apply to each of the divided segments to achieve a particular deflection of the droplet trajectory. In some cases, the voltages may be determined based on or using a position, or signals representative of or useful to derive the position, of the charged droplet determined by passing the charged droplet through a sensor element. In some examples, the signals may be processed with a computing device, circuit, an analog-to-digital converter, software, or other such systems to determine appropriate voltages to apply to the divided segments of the conductive layer.

In other examples, a system for detection of charged droplets from a droplet generator may include a sensing device having an aperture formed therein from a first surface to a second surface, the sensing device including a first conductive layer at the first surface, a second conductive layer at the second surface, a segmented sensor layer between the first conductive layer and the second conductive layer, and first and second dielectric layers positioned on opposite surfaces of the segmented sensor layer insulating the segmented sensor layer from the first conductive layer and the second conductive layer. The segmented sensor layer may include a plurality of segments positioned around a perimeter of the aperture. The system may also include a circuit element coupled to each of the plurality of segments of the segmented sensor layer. In some examples, the circuit element includes one or more transimpedance amplifiers. The system may also include a processor and a non-transitory computer-readable medium having instructions stored thereon that, when executed by the processor, cause the processor to perform operations including receiving, from one or more circuit elements coupled to the segmented sensor layer, a plurality of measured values corresponding to an induced current passing through the segments of the segmented sensor layer as the charged droplet passes through the aperture and determining a position of the charged droplet based on the measured values.

In other examples, a system for detection of charged droplets from a droplet generator may include a control device having an aperture formed therein and including a segmented conductive layer. The segmented conductive layer may include a plurality of segments positioned around a perimeter of the aperture. The system may also include a voltage controller coupled to each of the plurality of segments of the segmented conductive layer. In some examples, the voltage controller may be driven to generate potentials at each of the segmented conductive layers to establish an electric field at the aperture. The system may also include a processor and a non-transitory computer-readable medium having instructions stored thereon that, when executed by the processor, cause the processor to perform operations including applying a set of control voltages to the plurality of segments using the voltage controller to control a trajectory of the charged droplet as the charged droplet passes through the aperture. The set of control voltages may be generated based on determined position or velocity of the charged droplet, for example.

In another aspect, methods are described herein, such as methods for detecting or controlling charged droplets, such as from a droplet generator. In some examples, methods may be performed by or using the systems described herein. In some examples, a method of this aspect may include positioning a charted droplet detector and/or a charged droplet controller between a droplet generator and a target, directing a charged droplet from the droplet generator toward the target and through an aperture of a charged droplet detector and/or charged droplet controller. Methods of this aspect may include analyzing voltage signals generated by a charged droplet detector as a charged droplet passes through the aperture to determine a position of the charged droplet. Methods of this aspect may include determining and/or applying voltages to apply to segments of a segmented control layer to alter a trajectory of the charged droplet, such as by determining voltages based on a determined position of the charged droplet or signals from which the position of the charged droplet can be derived. Other examples of this aspect include corresponding devices and systems each configured to perform the actions of the methods. Optionally, methods or portions of the disclosed methods may be performed during execution of processor executable instructions.

In another aspect, a method for adjusting ejection parameters based on monitored charged droplets in an acoustic droplet ejection system is described herein. In some examples, the method is performed using systems described herein including acoustic droplet ejection systems, sensing elements, and other systems described herein. The method may include applying an acoustic signal to a fluid to cause a first droplet to be ejected from a reservoir toward a target through an aperture of a charged droplet detector using an acoustic droplet ejection system coupled to the reservoir. The method may also include determining, based on measurements of values corresponding to induced currents passing through the charged droplet detector, that the acoustic signal has caused the ejection of a satellite droplet. The method may further include, based on said determination, adjusting parameters of the acoustic droplet ejections system so as to prevent or reduce the ejection of satellite droplets in subsequent ejections. In some examples, methods or portions of the disclosed methods may be performed during execution of a processor executable instructions.

BRIEF DESCRIPTION OF THE DRAWINGS

A further understanding of the nature and advantages of various examples may be realized by reference to the following figures. In the appended figures, similar components or features may have the same reference label.

FIG. 18 illustrates a flow chart showing a process for detecting charged droplets ejected from a droplet generator, according to at least some examples.

FIG. 23 illustrates a flow chart showing a process for controlling charged droplets ejected from a droplet generator, according to at least some examples.

DETAILED DESCRIPTION

Figure 1:
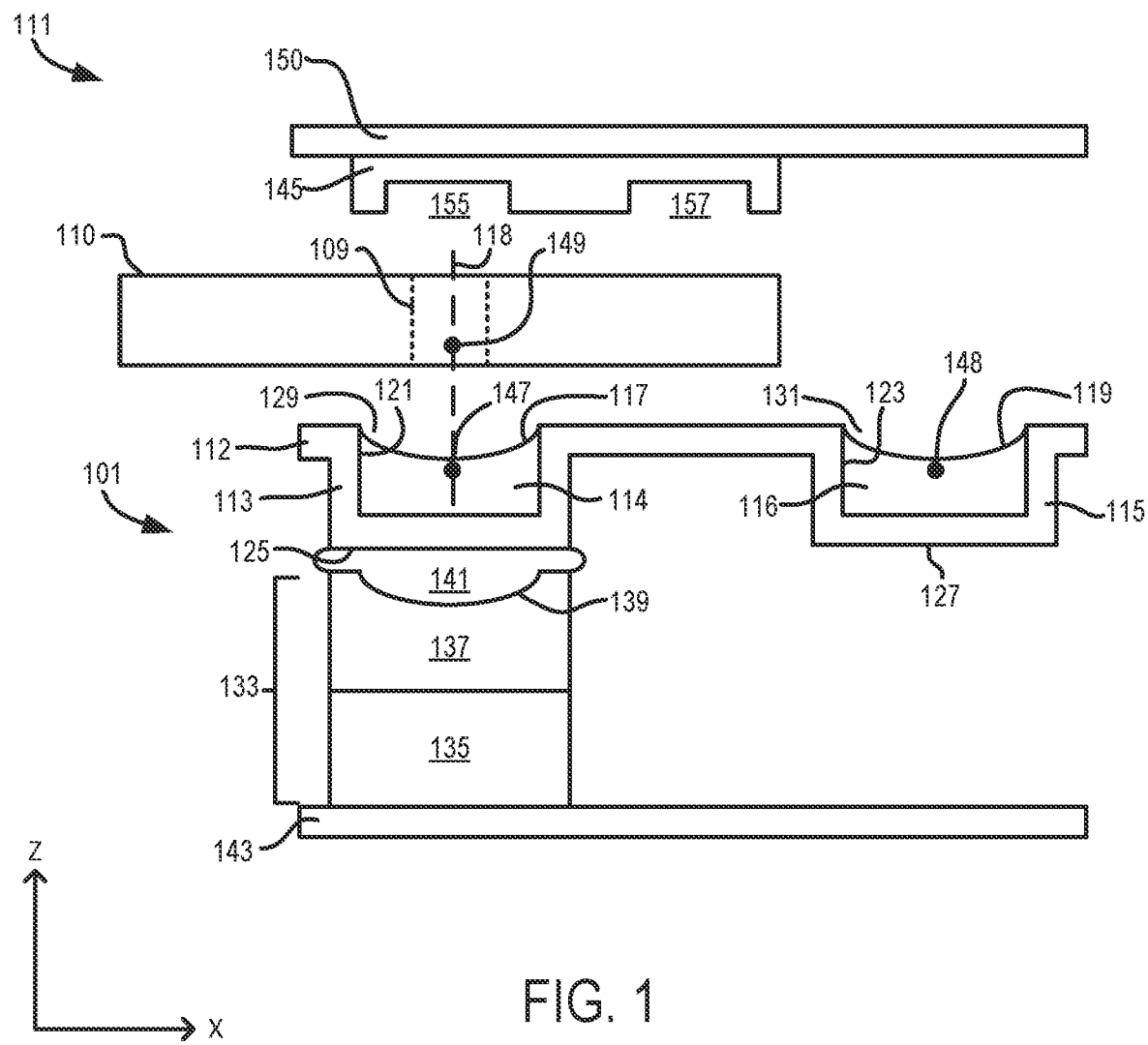
FIG. 1 illustrates a droplet generator including a charged droplet management device, according to at least some examples.

The present disclosure describes devices, systems, and methods for real-time detection, monitoring, and/or control of charged droplets using a compact, low-cost device. Numerous benefits can be achieved by the disclosed systems and methods including horizontal position detection (e.g., along X and Y axes) of a charged droplet, measurement of droplet velocity, detection of satellite droplets, measurement of droplet charge, droplet counting, droplet tracking, droplet trajectory control. In some examples, the devices, systems, and methods described herein can be useful for diagnostic measurements for alignment of a droplet generator, detection of misdirection in the trajectory of an ejected IO droplet, and/or correction of a misdirected ejected droplet. Advantageously, such aspects may he performed in real-time, during droplet generation, and can be used to provide feedback to modify or adjust system components, alignment, ejection parameters, or the like.

In some examples, the charge possessed by a droplet (droplet charge) may be related to a volume of a particular source fluid, such that a measurement of droplet charge over a number of droplets may be used to predict and/or determine a droplet volume. Though typical systems rely on manual calibration and/or large and expensive optical tracking systems, the devices, systems, and methods provided herein enable for real-time tracking and/or control of charged droplets with a compact and low-cost system. The real-time measurements enabled herein provide for increased manufacturing workflow efficiency and rapid optimization of droplet generators, such as for calibration of acoustic droplet ejection systems. The disclosed systems and methods can also allow for efficient coupling and precise alignment of a droplet generator with an inlet of a secondary device, such as a mass spectrometer or other analytical system. The devices, systems, and methods described herein are particularly useful for real-time tracking, for example to validate droplet placement in a mass spectrometer or other analytical system during sample placement for analysis. The devices, systems, and methods described herein are also useful for controlling droplet trajectory in real-time, optionally using a feedback mechanism where droplet position and/or trajectory is determined and droplet trajectory is adjusted, for example to optimize droplet placement in a mass spectrometer or other analytical system during sample placement for analysis.

Droplet generation may include processes such as acoustic droplet ejection, where droplets are acoustically actuated from a fluid reservoir and travel toward a target surface or location, but the instant disclosure is not limit to droplet generation using acoustic droplet ejection systems. For example, other systems, such as pressure-based, inkjet type, and/or microfluidic type droplet generator or ejection systems may be used. In some embodiments for acoustic droplet ejection, acoustic energy may be directed toward a fluid meniscus of a fluid contained within a reservoir of a sample container (e.g., a well of a microplate, a fluid sample tube, a microplate, a microfluidic device) or an inlet to an analytical instrument, system, or device, including a mass spectrometer or other instrument for analyzing chemical composition, genomic contents, genomic sequencing, particle sizers, body fluids, cell analysis (e.g., cytometers, hemocytometers), or the like. In some embodiments, a droplet generator may be oriented such that the droplets travel vertically upward toward a target surface or location. Though droplets are described as moving upwards herein, droplets may be transported in other directions, such as downwards and/or sideways in addition to upwards while implementing the systems and methods described herein. In an acoustic droplet ejection system, due at least in part to static effects (e.g., tilted fluid meniscus, static charge in well plastic) and dynamic effects (e.g., capillary waves in well), the droplet trajectory from the ejection fluid meniscus to the target surface may be misdirected from its intended path, resulting in misdirection of the droplet at the target surface/destination. Similar misdirections may occur in other droplet generation systems due to static and/or dynamic effects. The systems and methods described herein enable the real-time measurement of a droplet misdirection, allowing for monitoring and optionally for reduction of droplet misdirection, such as by implementing a droplet control scheme where droplet trajectory is adjusted.

When the target is a destination microplate well and multiple droplets are transferred, it may be desirable for all droplets to fuse and coalesce into a single larger droplet at the target. However, in some cases, droplets ejected by a droplet generator may arrive at the target location within a particular tolerance. For example, particular applications may impose a placement tolerance, such as within a dimension that is a fraction of the droplet diameter (e.g., within 100%, 75%, 50%, 25%, 10%, or 5% of the droplet diameter). Such a placement tolerance may, for example, ensure that a droplet arrives on target or that different droplets coalesce upon reaching the target. In some cases, droplets may arrive off-target by about 200% or less of the droplet diameter (e.g., 2.5 nL droplets, which have a diameter 168 microns, may arrive 400 microns off target). In a preferred case, droplets consistently land at a target location, or within a distance from the target location that is 125% of the droplet diameter or less, with less than 1 per 1000 droplets landing farther from the target location than 125% of the droplet diameter. After the first droplet, subsequent droplets directed at the target location may desirably fuse, coalesce, and mix into a single larger droplet. In ideal cases, there should be no droplets off-target, no scatter, and no spray landing in isolation from the main droplet. Droplet placement on target may be tolerant to the widest possible range of initial speed and direction at droplet formation as well as fluctuations along the droplet flight path. In some examples, the target may be an inlet or orifice associated with wells in a microplate, microfluidic devices, or analytical instruments. Droplets may be sized to appropriately reach the target without impacting the sides or walls of the inlet or orifice. For example, the orifice may have a diameter greater than or about 130% of a diameter of the droplet, such as greater than or about 150%, 200%, 250%, 300%, 350%, 400%, 450%, 500%, or from about 130% to about 1000% of a diameter of the droplet, In some cases, the target may be associated with a mass spectrometer (e.g., an open port probe (OPP) interface of a mass spectrometer) or other analytical instrument or system. An opening of the OPP may be defined at least in part by a coaxial arrangement (along a capillary axis) of a capillary and a housing. In some such cases, a droplet placement tolerance of less than or about 125% of a droplet diameter from a vortex core (capillary axis) is a desirable feature so as to ensure accurate droplet placement within the OPP. In these cases, droplet placement of over 125% of a droplet diameter from the target position can result in lower ion counts and higher charge volume at the mass spectrometer. Droplet placement greater than or about 200% or 250% of a droplet diameter may result in a missed ion count peak.

According to examples described herein, a charged droplet management system can be located between a target and a droplet generator, such as between the target and a source well of an acoustic droplet ejection system. A charged droplet management system may include an aperture that may be aligned with an ejection axis of the droplet generator (e.g., a transducer axis of the ejection system) such that droplets ejected by the droplet generator pass through the aperture towards the target. The charged droplet management system may include one or both a sensing or detector component and/or a control component. In either case, the charged droplet management system may include a number of segmented electrodes that surround the aperture.

For use as a charged droplet detector, as a charged droplet passes through the aperture, currents are induced in each segmented electrode, and are detected using a circuit element to convert each segment current to a corresponding output value. The output value may correspond to induced current or voltage values representative of or proportional to the induced current. In some examples, the circuit element may include one or more transimpedance amplifiers. Though the description herein may reference transimpedance amplifiers, other suitable circuit elements may be implemented in the place of transimpedance amplifiers. Since the geometry of the sensor components and aperture are known and pre-defined, the induced currents may be modelled and determined. For example ; the Raino-Shockley theorem may be leveraged to determine droplet charge, velocity, and/or trajectory based on the currents induced in the segmented electrodes. In particular, the sum of all values, such as induced currents (and hence transimpedance amplifier voltages) may be directly related to the droplet charge and velocity. Additionally, the difference in signals from opposing segments around the aperture may be used to determine the lateral position of each droplet as it passes through the aperture.

For use as a charged droplet controller, as a charged droplet passes through the aperture, voltages may be applied to each segmented electrode, to generate an electric field that applies a force on the charged droplet to adjust its trajectory. Various configurations of segmented electrodes may be used, such as to allow precise adjustment of charged droplet trajectory over two axes (e.g., X and Y axes). The voltages may be applied by one or more voltage controllers or other suitable components that may be implemented as or in place of voltage controller.

FIG. 1 illustrates a system 111 having a charged droplet management device 110, according to at least some examples. As with all figures referenced herein, FIG. 1 is not to scale, and certain dimensions may be exaggerated for clarity of presentation. The system 111 is shown including a droplet generator 101 for generation of charged droplets. In FIG, 1, droplet generator 101 is depicted as an acoustic droplet ejection system, but such a configuration is not limited and other droplet generators may be used without departing from the aspects described herein. The system 111 illustrated in FIG. 1 is configured to receive a sample container 112, optionally separate from the system 111, that may be a consumable (e.g., a microplate, a fluid sample tube, or a well plate) having one or more reservoirs. For example, the sample container 112 includes a plurality of reservoirs, i.e., two or more reservoirs, with a first reservoir indicated at 113 and a second reservoir indicated at 115, each adapted to contain a fluid having a fluid surface, e.g., a first fluid 114 and a second fluid 116 having fluid surfaces respectively indicated at 117 and 119. First fluid 114 and second fluid 116 may be the same or different. In some examples, the sample container 112 may include only a single reservoir, with the systems and methods herein enabling verification of successful droplet ejection, tracking droplet misdirection, and droplet control from a single reservoir, though systems and methods are contemplated where droplets can be ejected, tracked, and/or controlled from multiple reservoirs. As shown, the reservoirs are of substantially identical construction so as to be substantially acoustically indistinguishable, but identical construction is not a requirement. The reservoirs are shown as separate removable components but may, if desired, be fixed within a plate or other substrate. For example, the plurality of reservoirs may comprise individual wells in a well plate, which may be, although not necessarily, arranged in an array. Each of the reservoirs 113 and 115 is preferably axially symmetric as shown, having vertical walls 121 and 123 extending upward from reservoir bases 125 and 127 and terminating at openings 129 and 131, respectively. The material and thickness of each reservoir base may be such that acoustic radiation may be transmitted therethrough and into the fluid contained within the reservoirs.

The system 111 includes an acoustic ejector 133 comprising an acoustic radiation generator 135 for generating acoustic radiation and a focusing device 137 for focusing the acoustic radiation within the fluid from which a droplet is to be ejected, near the fluid surface. As shown in FIG. 1, the focusing device 137 may comprise a single solid piece having a concave surface 139 for focusing acoustic radiation, but the focusing device 137 may be constructed in other ways as discussed below. The acoustic ejector 133 is thus adapted to generate and focus acoustic radiation so as to eject a droplet of fluid from each of the fluid. surfaces 117 and 119 when acoustically coupled to reservoir wells 113 and 115 and thus to first fluid 114 and second fluid 116, respectively. The acoustic radiation generator 135 and the focusing device 137 may function as a single unit controlled by a single controller, or they may be independently controlled, depending on the desired performance of the device. Typically, single ejector designs are preferred over multiple ejector designs because accuracy of droplet placement and consistency in droplet size and velocity are more easily achieved with a single ejector, but the disclosure contemplates that multiple ejectors may also be used.

It will be appreciated that any of a variety of focusing device 137 may be employed. in conjunction with the present invention. For example, one or more curved surfaces may be used to direct acoustic radiation to a focal point near a fluid surface. One such technique is described in U.S. Pat. No. 4,308,547 to Lovelady et al. Focusing device 137 with a curved. surface have been incorporated into the construction of commercially available acoustic transducers such as those manufactured by OLYMPUS CORP. (Waltham, Mass.). In addition, Fresnel lenses are known in the art for directing acoustic energy at a predetermined focal distance from an object plane. See, e.g., U.S. Pat. No. 5,041,849 to Quate et al. Fresnel lenses may have a radial phase profile that diffracts a substantial portion of acoustic energy into a predetermined diffraction order at diffraction angles that vary radially with respect to the lens. The diffraction angles may be selected to focus the acoustic energy within the diffraction order on a desired object plane.

In operation, reservoir wells 113 and 115 of the device are each filled with first fluid 114 and second fluid 116, respectively, as shown in FIG. 1. The acoustic ejector 133 is positionable by using an ejector positioner 143, which may include, for example, an actuator that is able to move the acoustic ejector 133 to a desired location in order to achieve acoustic coupling between the ejector and the reservoir through acoustic coupling medium 141. In FIG. 1, a substrate 145 is shown positioned above and in proximity to the first reservoir well 113 such that one surface of the substrate faces the reservoir and is substantially parallel to or arranged opposing the fluid surface 117 of the first fluid 114 therein. In some embodiments, the substrate 145 may be a sample container (e.g., a microplate, a sample tube) that includes target areas for droplet ejection. Once the ejector, the reservoir and the substrate are in proper alignment, the acoustic radiation generator 135 is activated to produce acoustic radiation that is directed by the focusing device 137 to a focal point 147 at or near the fluid surface 117 of the first reservoir. As a result, droplet 149 is ejected from the fluid surface 117 onto a designated site on the underside surface of the substrate 145, which includes well 155. In some cases, surface tension or capillary forces may aid or cause an ejected droplet to be retained on the substrate surface. Although not illustrated in FIG. 1, this disclosure contemplates that an interface of an analytical device, system, or instrument, such as a mass spectrometer (e.g., an OCT), or any other suitable target, may replace the substrate 145.

The system 111 includes a substrate positioning device 150 that may be adjusted to reposition the substrate 145 over reservoir 115 in order to receive a droplet therefrom at a second designated site. For example, the acoustic ejector 133 can be repositioned by the ejector positioner 143 below reservoir 115 and in acoustically coupled relationship thereto by virtue of acoustic coupling medium 141. Once properly aligned, the acoustic radiation generator 135 of acoustic ejector 133 can be activated to produce acoustic radiation that is then directed by focusing device 137 to a focal point 148 at or near the fluid surface 119 of the second fluid 116, thereby ejecting an additional droplet onto the substrate 145 at well 157. It will be appreciated that such operation is illustrative of how the device may be used to eject a plurality of fluids from reservoirs in order to form a pattern, e.g., an array, on the substrate 145. It will be also be appreciated that the device may be adapted to eject a plurality of droplets from one or more reservoirs onto the same site of the substrate 145.

Although FIG. 1 illustrates a particular configuration, the disclosure contemplates any suitable configuration that may readily adapt the disclosed concepts accordingly. For example, the 111 system may be oriented in a different manner (e.g., with the acoustic ejector 133 disposed above the substrate 145 such that droplets are ejected downward, or with the acoustic ejector 133 positioned to the side of the substrate 145 such that the droplets are ejected sideways).

As illustrated, the system 111 includes a charged droplet management device 110 that is able to sense, detect, characterize, deflect, and/or manipulate velocity or direction of a charged droplet passing therethrough. In some embodiments, the charged droplet management device 110 may include one or several conductive layers, as described further below. In some embodiments, the system 111 may apply or impart a charge on the droplet 149 prior to, during, or after ejection. As such, droplet 149 may carry a net charge. The net charge may be induced on the droplet by applying a voltage to one or more of the layers of the charged droplet management device 110. The voltage may generate an electric field at the fluid meniscus that induces a net charge on ejected droplets. In sonic examples, without an external electric field, the native charge of droplets may be measured. Such net charge may be imparted by, for example, applying a voltage or charge (e.g., a 1.5 kV bias) directly to the fluid 114 of FIG. 1, passing the droplet through an additional biased conductive layer held at a reference voltage, e.g., a high voltage, positioned in between the reservoir and the charged droplet management device 110, or voltage biasing the entirety of the charged droplet management device 110 or a portion of the charged droplet management device 110.

The charge imparted to a charged droplet may be positive or negative, depending on the voltage and/or electric field at the fluid 114 or meniscus. Optionally, a polarity of the charged imparted to the droplets may change, such as from positive to negative or from negative to positive. Polarity may be altered by adjusting the voltage and/or electric field at the fluid or meniscus during droplet generation, for example, such as by switching a polarity of the voltage. Polarity may be altered periodically or aperiodically. In some cases, changing polarity during droplet generation can allow for reducing the build-up of charge at the target (e.g., substrate 145), as negatively charged droplets can cancel built-up positive charge previously developed at the target and/or positively charged droplets can cancel built-up negative charge previously developed at the target. For sensing or control of the charged droplets by charged droplet management device 110, operation using voltages suitable for detection or control of positive or negatively charged droplets can be synchronized with the polarity of the droplets generated. For use in directing charged droplets to a mass spectrometer or other analytical system, operation of the mass spectrometer or other analytical system for analysis of positive or negatively charged droplets can be synchronized with the polarity of the droplets generated.

The charged droplet management device 110 includes an aperture 109, through which droplet 149 travels from the first reservoir well 113 to well 155. The aperture 109 is aligned with a transducer axis 118 of the acoustic ejector 133. Without limitation, the aperture of a charged droplet management device may have a diameter of from 1 mm to 5 mm, or more, such as from 1 mm to 1.5 mm, from 1.5 mm to 2 mm, from 2 mm to 2.5 mm, from 2.5 mm to 3 mm, from 3 mm to 3.5 mm, from 3.5 mm to 4 mm, from 4 mm to 4.5 mm, or from 4.5 mm to 5 mm. In some examples, the aperture of a charged droplet management device may have a diameter that is larger than a diameter of the droplet, such as where the aperture has a diameter that is greater than or about 120% of a diameter of the droplet or less than about 500% of the diameter of the droplet. Without limitation, the aperture may have a diameter that is greater than or about 120%, 130%, 140%, 150%, 160%, 170%, 180%, 190%, 200%, 225%, 250%, 275%, 300%, 325%, 350%, 375%, 400%, 425%, 450%, 475%, or 500% of a diameter of the droplet. In some cases, the aperture diameter may be greater than 500% of the diameter of the droplet, for example the aperture diameter may be as large as 3000% or 5000% of the diameter of the droplet, or larger.

In sortie examples, the charged droplet management device 110 may be positioned parallel to or at an angle relative to a surface of the first reservoir well 113. In some examples, the charged droplet management device 110 may be positioned diagonally, at an angle relative to the first reservoir well 113.

Charged droplet management device 110 may be used for sensing, detection, or characterization of the charged droplet in a configuration referred to herein as a charged. droplet detector or charged droplet sensor. Charged droplet management device 110 may, alternatively or additionally, be used for controlling a direction, velocity, or trajectory of the charged droplet in a configuration referred to herein as a charged droplet controller. A charged droplet detector or charged droplet sensor may advantageously be useful for identifying a position of a charged droplet passing through the aperture 109, such as to determine a lateral (e.g., X, Y) position of the charged droplet. Further, the charged droplet detector may be used to determine velocity, droplet timing (e.g., arrival at the aperture), total droplet charge, and/or a presence of one or more charged satellite droplets. A charged droplet controller may advantageously be useful for adjusting a charged droplet trajectory, such as by applying forces (e.g., an impulse force) to steer a charged droplet (e.g., by generating a deflection in a lateral direction).

Feedback systems may be included along with or as part of charged droplet management device 110, so as to permit determining a lateral position of the charged droplet using a charged droplet detector and to provide steering signals to a charged droplet controller, such as voltage signals determined based on the lateral position of the charged droplet. In this way, charged droplet management device 110 can identify misdirected charged droplets and adjust their trajectory so that they are received at the intended target. For example, a charged droplet detector component of charged droplet management device 110 can be used to generate current and/or voltage waveforms, as described in further detail below, by passage of a charged droplet therethrough, and providing such waveforms to signal processing components to extract the position of the charged droplet at the charged droplet detector. The position of the charged droplet detector can be further analyzed and/or used, such as by the signal processing or other processing components, to determine appropriate steering voltages to apply to a charged droplet controller component of charged droplet management device 110. In some examples, the steering voltages may be determined using a look-up table or function in which position is provided as an input and steering voltage(s) are provided as output(s).

Figure 2:
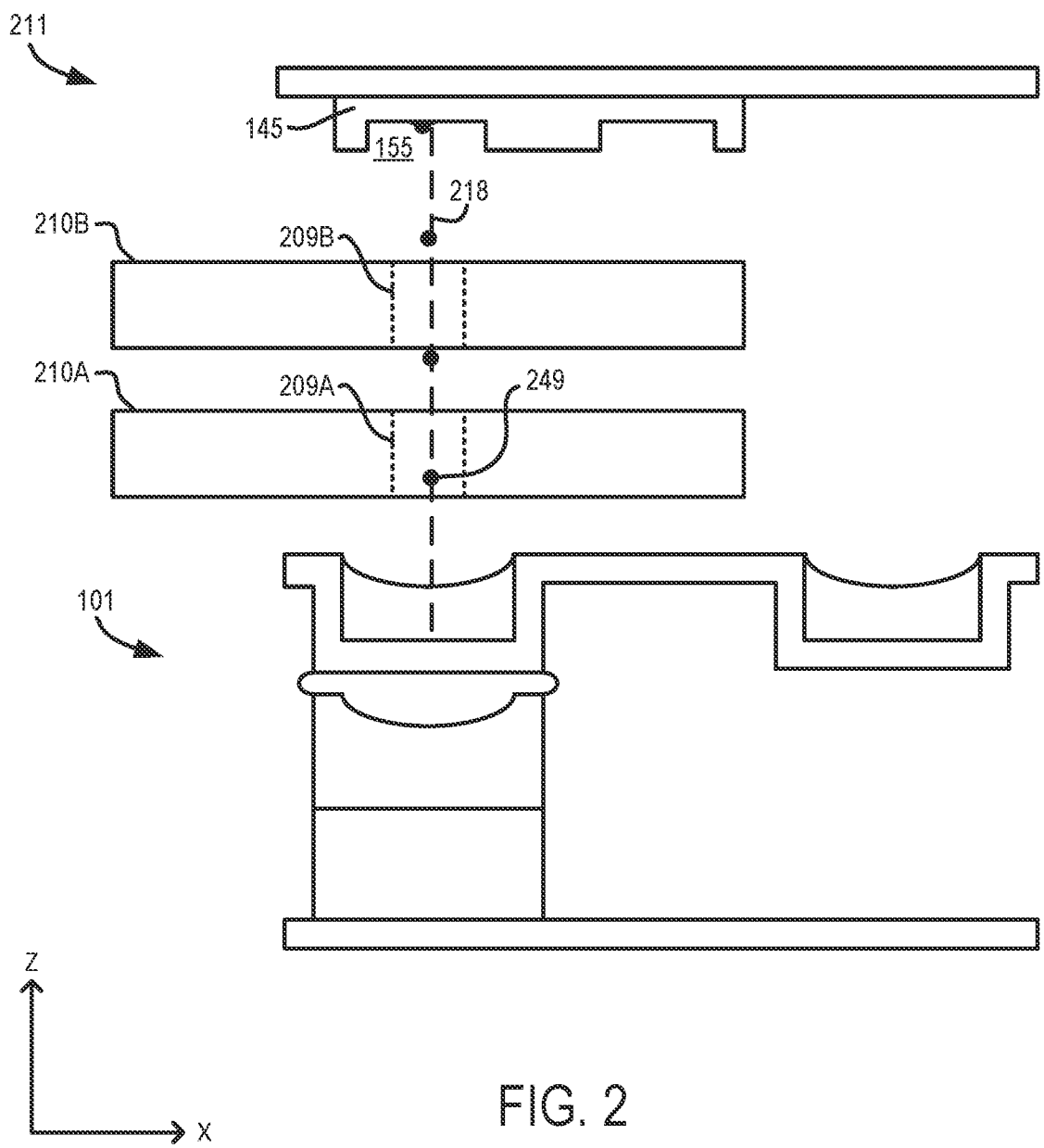
FIG. 2 illustrates a droplet generator including a charged droplet detector and a. charged droplet controller, according to at least some examples.

In some examples, both a charged droplet detector and a charged droplet controller may be used, which may be integrated into a single charged droplet management device or as separate components. FIG. 2 shows an example system 211, which may be the same as or different from system 111 shown in FIG. 1, which includes a charged droplet detector 210A and a charged droplet controller 210B, in addition to other components shown in system 111, including droplet generator 101 and substrate 145. In the configuration shown, a charged droplet detector 210A is positioned closer to droplet generator 101 and charged droplet controller 210B is positioned closer to substrate 145, with their apertures 209A and 209B, respectively, arranged with respect to one another such that droplet 249 passes through both apertures 209A and 209B as it travels towards substrate 145 along axis 218. Such a configuration is not intended to be limiting. For example, charged droplet controller 210B may instead be positioned closer to droplet generator 101 and charged droplet detector 210A may be positioned closer to substrate 145. In some examples, only charged droplet detector 210A is used and charged droplet controller 210B is not present. In other examples, only charged droplet controller 210B is used and charged droplet detector 210A is not present. Optionally, multiple charged droplet detectors 210A may be used. Optionally, multiple charged droplet controllers 210B may be used. In some examples, two charged droplet detectors 210A may be used with a single charged droplet controller 210B between them. Such a configuration may be useful, in some examples, for detecting a charged droplet position by a first charged droplet detector, modifying a charged droplet trajectory by the charged droplet controller, and detecting the charged droplet position by a second charged droplet detector after the trajectory modification. Any suitable spacing or distance between components of a charged droplet management device (e.g., between charged droplet detector 210A and charged droplet controller 2108) may be used. In some examples, a spacing between charged droplet detector 210A and charged droplet controller 210B may be from 25% to 400% of a diameter of the aperture 209A and/or aperture 209B. In some examples, a spacing between components of a charged droplet management system (e.g., charged droplet detector(s) and/or charged droplet controller(s)) may be from 0.1 mm to 10 mm, or more, such as from 0.1 mm to 0.5 mm, from 0.5 mm to 1 mm, from 1 mm to 1.5 mm, from 1.5 mm to 2 mm, from 2 mm to 2.5 mm from 2.5 mm to 3 mm, from 3 mm to 3.5 mm, from 3.5 mm to 4 mm, from 4 mm to 4.5 mm, from 4.5 mm to 5 mm, from 5 mm to 5.5 mm, from 5.5 mm to 6 mm, from 6 mm to 6.5 mm, from 6.5 mm to 7 mm, from 7 mm to 7.5 mm from 7.5 mm to 8 mm, from 8 mm to 8.5 mm, from 8.5 mm to 9 mm, from 9 mm to 9.5 mm, or from 9.5 mm to 10 mm. In sonic examples, the spacing between components of a charged droplet management system may be as large or larger than a diameter of the droplet, such as where the spacing is greater than or about 100% of a diameter of the droplet, or more. Without limitation, the spacing between components of the charged droplet management is greater than or about 50%, 100%. 150%, 200%, 250%. 300%, 350%, 400%, 450%, 500%, 550%. 600%, 650%, 700%, 750%, 800%, 850%,900% 950%, 1000%, 1500%, 2000%, 3000%, 4000% or 5000% of a diameter of the droplet, or more.

For sensing, detection, or characterization of the charged droplet using a charged droplet detector, as the charged droplet 149 or 249 travels through aperture 109 or 209A, current is induced on conductive layers of the charged droplet detector. The magnitude of the induced current may be associated with a relative position of the charged droplet from the detector plates or segments thereof, such as segments 366A, 366B, 366C, and 366D shown in FIG. 3 and segments 566A, 566B, 566C, and 566D shown in FIG. 5. For example, a segment producing a larger induced current may be relatively closer to the droplet 149 than other segments, and by determining a differential between the induced current of the different segments, a weighting or scaling factor may be produced that can be used to identify a two-dimensional position (e.g., X-Y) of the droplet 149 as it passes through aperture 109 and past segments of the detector plate.

As illustrated in FIG. 2, charged droplet 249 has a trajectory (e.g., in the absence of influence by charged droplet controller 209B) such that it arrives at well 155 shifted from axis 218, which represents the intended target position for charged droplet 249. The lateral deviation of charged droplet from axis 218 at aperture 209A can be determined using charged droplet detector 210A, and such lateral deviation can be used to determine voltages to apply to components of charged droplet controller 21013 to generate an electric field at aperture 209B that can deflect the trajectory of charged droplet 249 back towards the target position at well 155.

Figure 3:
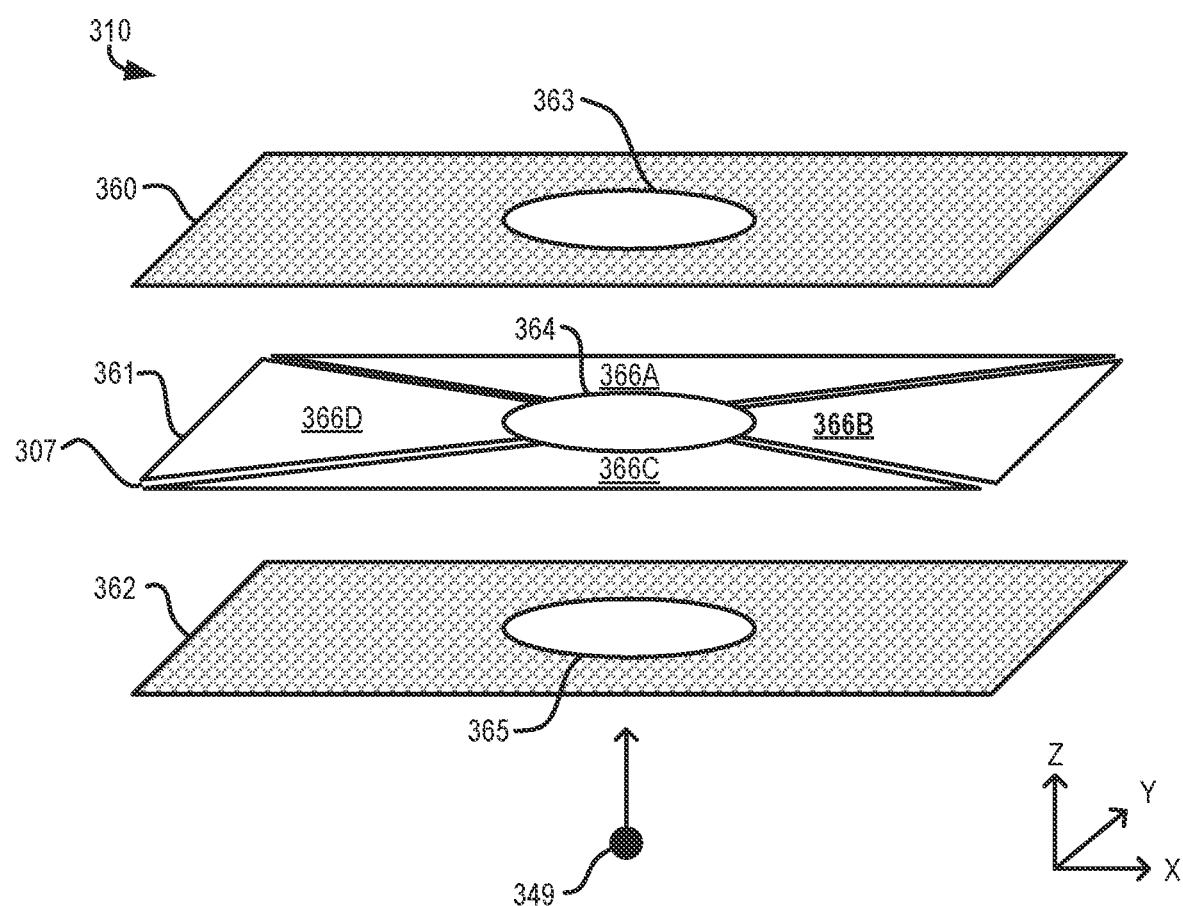
FIG. 3 illustrates an exploded view of conductive layers of a charged droplet detector, according to at least some examples.

FIG. 3 illustrates an exploded view of conductive layers of a charged droplet detector 310, according to at least some examples. Charged droplet detector 310 may correspond to one implementation of charged droplet management device 110 of FIG. 1. The charged droplet detector 310 includes a first conductive layer 360, a second conductive layer 362, and a sensor layer 361. As a charged droplet 349 passes through an aperture of charged droplet detector 310, such as an aperture comprising or including the apertures 363, 364, and 365, an induced current is generated in each segment of sensor layer 361 (e.g., segments 366A, 366B, 3660, and 366D of FIG. 3). A spacing or insulating region 307 is positioned between segments 366A, 366B, 366C, and 366D to electrically isolate the segments from one another. The amount of induced current in each segment 366A, 366B, 366C, 366D may depend on the lateral position of the charged droplet 349 as it passes through the aperture 364 and the relative sizes of the segments. This induced current at each of the segments may be measured using one or more circuit elements. For example, a transimpedance amplifier may be connected to each segment, and such transimpedance amplifier may produce a voltage output from each segment that can be measured. As those of skill in the art are aware, such a voltage output may be directly related to the induced current in the detector segment, through the feedback resistance of the transimpedance amplifier, by application of Ohm's law. Thus, the disclosure contemplates that the charged droplet detector or an associated system may measure voltage, current, or any other measurement from which the induced current can be derived. Although this disclosure contemplates that any suitable voltage/current/charge measurement circuit elements may be used, examples using transimpedance amplifiers for measuring output voltages are provided as an example.

A droplet that passes through the exact center of the aperture 364 will induce equal currents in all four segments 366A, 366B, 366C, and 366D if the segments are equal in dimensions, and therefore equal voltages at the respective outputs of the transimpedance amplifiers connected to the segments. A droplet that is misdirected from the aperture center, passing closer to one segment than another, will induce a larger current in the segment that it passes closer to, and a smaller current in a segment which it passes further from, as it travels through the device. These differences in induced current may be well modelled by one skilled in the art, using for example the Ramo-Shockley theorem. Similarly, differences in induced current may be well modelled by the skilled artisan for nonequal segments 366A, 366B, 3660 and 366D by accounting for their differences in size tin the model. By measuring the difference between signals detected from the various segments and normalizing or weighting appropriately, such as by the total sum signal from all sensors and/or by the aperture perimeter portion occupied by each segment, or some more complex method determined from the mode, one may extract the lateral location of the droplet as it passes through the aperture 364 of the charged droplet detector 310. One may extract the total droplet charge, or a signal proportional to the total droplet charge, from the total sum signal from all sensors, with minor corrections due to any lateral misalignment of the droplet from the aperture center, as measured using the differential signals.

In some examples, by measuring the difference in measured current between signals detected from opposing segments, for example opposing along the X and/or V axis (e.g., referencing FIG. 3, opposing segments 366A and 366C, opposing segments 366B and 366D), and normalizing or weighting appropriately, such as by the total sum signal from all segments of sensor layer 361 or using weighting factors characteristic of a perimeter portion occupied by each segment or characteristic of other aspects or behavior of the segments), one may extract the lateral (e.g., X,Y) location of the droplet as it passes through the aperture 364 of the charged droplet detector 310. In some cases, the droplet charge can also be extracted, such as by using the total sum signal from all segments, with minor corrections due to any lateral misalignment of the droplet from the aperture center, as measured using the differential signals. The measurement of both the droplet lateral position and droplet charge are fundamental, and may require no calibration of the sensor, other than knowledge of its geometry, and knowledge of the current-to-voltage conversion characteristics of the transimpedance amplifiers, though in some examples calibration may be used.

In some examples, additional sensor layers 361 may be stacked together perpendicular to the travel axis of droplet 349 to track a droplet as it passes through the aperture of the sensor device 310. Although the examples described herein focus on determining or inferring induced current by measuring voltages from transimpedance amplifiers, the disclosure contemplates measuring any suitable value from which the induced current can be determined.

Figure 4:
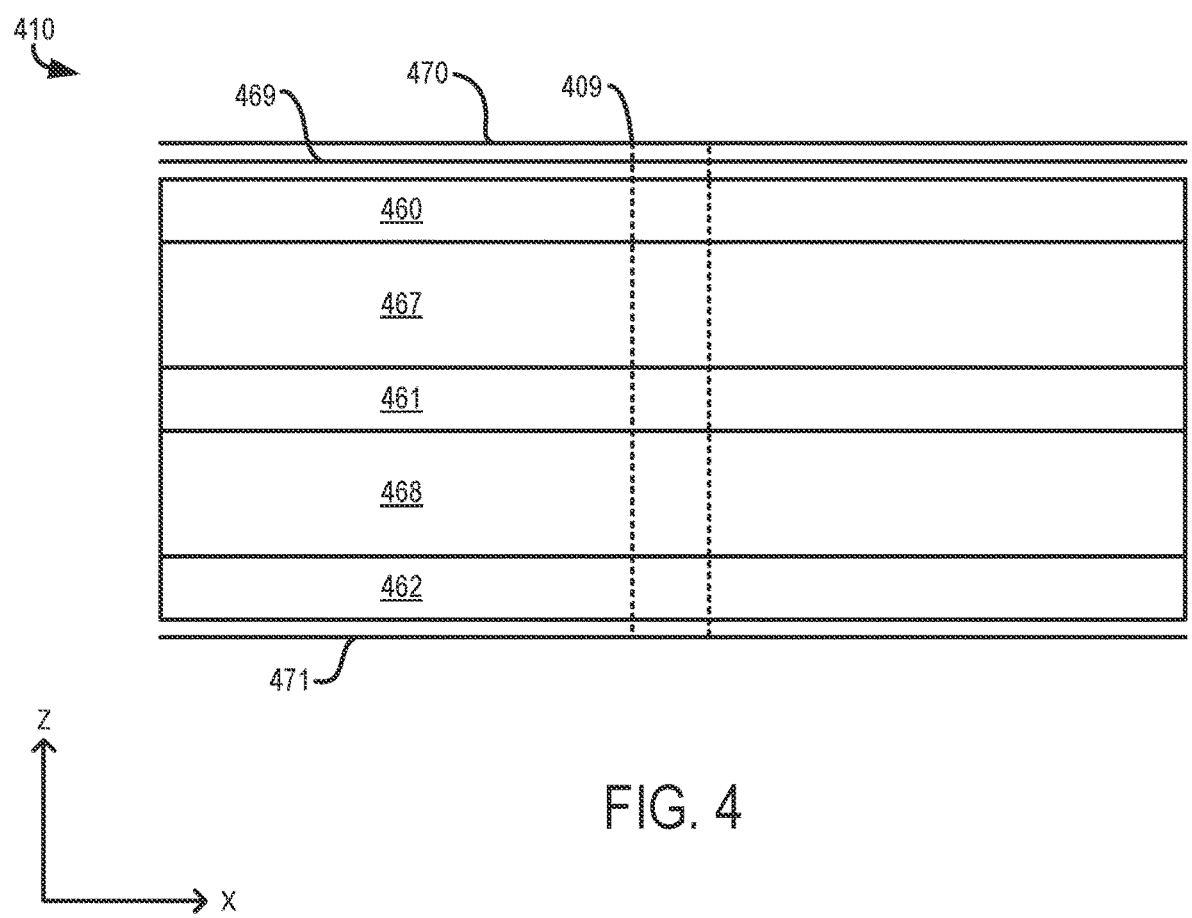
FIG. 4 illustrates a side view of a charged droplet detector, according to at least some examples.

FIG. 4 illustrates a side view of a charged droplet detector 410, which may be different from or the same as a component of charged droplet management device 110 of FIG. 1, charged droplet detector 210A of FIG. 2, or charged droplet detector 310 of FIG. 3, according to at least some examples. The layers of the charged droplet detector 410 are shown, though additional layers may be implemented in some examples. In some examples, the charged droplet detector 410 may be or comprise a printed circuit board including a printed and/or silkscreened top layer 470, and soldermask layers 469 and 471. Within a printed circuit of the charged droplet detector 410 are conductive layers 460 and 462 and sensor layer 461 (which is itself a conductive layer) as described above with reference to components of charged droplet detector 310 of FIG. 3. Insulating layers 467 and 468 are positioned between the conductive layers 460 and 462 and the sensor layer 461 to electrically isolate the conductive layers 460 and 462 and the sensor layer 461. All layers define an aperture 409 passing through charged droplet detector 410.

The insulating layers 467 and 468, conductive layers 460 and 462, and sensor layer 461 may each have any suitable thickness. For example, insulating layers and/or conductive layers (including sensor layers) in a charged droplet detector may have thicknesses of from 0.1 mm to 5 mm, such as from 0.1 mm to 1.0 mm, or more, such as from 0.1 mm to 0.2 mm, from 0.2 mm to 0.3 mm, from 0.3 mm to 0.4 mm, from 0.4 mm to 0.5 mm, from 0.5 mm to 0.6 mm, from 0.6 mm to 0.7 mm, from 0.7 mm to 0.8 mmm, from 0.8 mm to 0.9 mm, from 0.9 mm to 1 mm, from 1 mm to 1.1 mm, from 1.1 mm to 1.2 mm, from 1.2 mm to 1.3 mm, from 1.3 mm to 1.4 mm, from 1.4 mm to 1.5 mm, from 1.5 mm to 1.6 mm, from 1.6 mm to 1.7 mm, from 1.7 mm to 1.8 mm, front 1.8 mm to 1.9 mm, from 1.9 mm to 2 mm, from 2 mm to 2.1 mm, from 2.1 mm to 2.2 mm, from 2.2 mm to 2.3 mm, from 2.3 min to 2.4 mm, from 2.4 mm to 2.5 mm, from 2.5 mm to 2.6 mm, from 2.6 mm to 2.7 mm, from 2.7 mm to 2.8 mm, from 2.8 mm to 2.9 mm, from 2.9 mm to 3 mm, from 3 mm to 3.1 mm, from 3.1 mm to 3.2 mm, from 3.2 mm to 3.3 mm, from 3.3 mm to 3.4 mm, from 3.4 mm to 3.5 mm, from 3.5 mm to 3.6 mm, from 3.6 mm to 3.7 mm, from 3.7 mm to 3.8 mm, from 3.8 mm to 3.9 mm, from 3.9 mm to 4 mm, from 4 mm to 4.1 mm, from 4.1 mm to 4.2 mm, from 4.2 mm to 4.3 mm, from 4.3 mm to 4,4 mm, from 4.4 mm to 4.5 mm, from 4.5 mm to 4.6 mm, from 4.6 mm to 4.7 mm, from 4.7 mm to 4.8 mm, from 4.8 mm to 4.9 mm, from 4.9 mm to 5 mm.

Thicknesses for conductive layers and insulating layers may extend outside of these ranges, in some cases, and particularly conductive layers may have thicknesses less than 0.2 mm or less than 0.1 mm. In some examples, the thicknesses for conductive layers or insulating layers may be as large or larger than a diameter of the droplet, such as where the thickness is greater than or about 100% of a diameter of the droplet, or more. Without limitation, the thickness of a conductive layer or insulating layer is greater than or about 50%, 100%, 150%, 200%, 250%, 300%, 350%, 400%, 450%, 500%, 550%, 600%, 650%, 700%, 750%, 800%, 850%, 900%, 950%, 1000%, 1500%, 2000%, 3000%, 4000% or 5000% of a diameter of the droplet, or more. In some cases, a ratio of a diameter of the aperture to a thickness of one or more of the insulating layers may be from 0.25 to 4. In some cases, a ratio of a diameter of the aperture to a thickness of one or more of the conductive layers may be from 0.25 to 4. Optionally, thicknesses for conductive layers may be dictated by manufacturing, such as in the case of a charged droplet management device comprising a printed circuit board, where copper foil or copper plating thicknesses may be standardized (e.g., copper layer thickness of about 35 μm, about 70 μm, about 105 μm, or about 140 μm). In some examples, the thicknesses of each insulating layer are the same, though they can optionally be different. In sonic examples, the thicknesses of each conductive layer, including a sensor layer, are the same, though they can optionally be different. In some examples, the thicknesses of conductive layers and insulating layers are different from each other, though they can optionally be the same.

Although the detector in FIG. 4 shows three total electrode and sensor layers, additional or fewer conductive layers and/or additional sensor layers may be included in some examples. In some examples, the layers, including the conductive layers 460 and 462 and the sensor layer 461 as well as other layers may be arranged in a non-parallel manner such that the layers are not along parallel planes, which may be useful for three-dimensional detection of a charged droplet position. In some embodiments, the sensor layer 461 and the conductive layers 460 and 462 are or comprise a metal, such as copper, for example. The sensor layer 461 and the conductive layers 460 and 462 may have any suitable lateral dimensions, such as from 0.5 cm to 5 cm (e.g. 0.5 cm, 0.6 cm, 0.7 cm, 0.8 cm, 0.9 cm, 1.0 cm, 1.1 cm 1.2 cm, 1.3 cm 1.4 cm, 1.5 cm 2 cm, 2.5 cm, 3 cm, 3.5 cm. 4 cm, 4.5 cm, or 5 cm), though larger or smaller dimensions may be implemented. In some examples, the sensor layer 461, or components thereof such as segments of sensor layer 461, may have a larger lateral dimension than the conductive layers 460 and 462 to provide for electrical connections to the transimpedance amplifiers. For charged droplet sensing, the conductive layers 460 and 462 can be electrically coupled to a reference electrical potential, such as being grounded, while the sensor layer 461 is electrically coupled to a charge sensitive circuit or preamplifier, such as a transimpedance amplifier. The integrating circuit of a transimpedance amplifier can be used to transform induced current into a detectable voltage output. The insulating layers 467 and 468 may be formed of a suitable dielectric and/or insulating material, such as a laminate (e.g., as used in some printed circuit boards).

Figure 5:
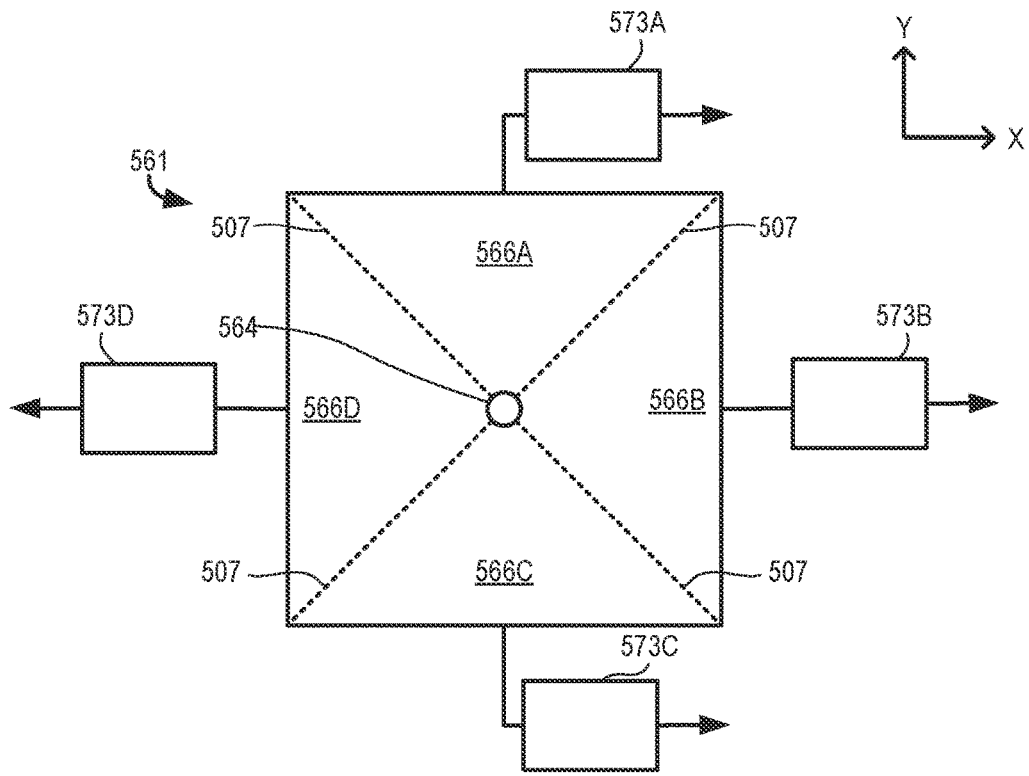
FIG. 5 illustrates a top plan view of a segmented conductive layer of a charged droplet detector, according to at least some examples.

FIG. 5 illustrates a top plan view of sensor layer 561 of a charged droplet detector, such as a charged droplet detector of charged droplet management device 110 of FIG. 1, charged droplet detector 210A of FIG. 2, charged droplet detector 310 of FIG. 3, or charged 11) droplet detector 410 of FIG. 4, according to at least some examples. The sensor layer 561 defines the aperture 564 which may be at least part of aperture 509 of the charged droplet detector 510 and may have a diameter of 2 mm, in some embodiments. In some examples the diameter may be greater than or less than 2 mm. The segments 566A, 566B, 566C, and 566D of the sensor layer 561 divide the layer into equal sized segments that surround the aperture 564, with each segment optionally providing an equal portion of the perimeter of the aperture 564, but such configuration is not intended to be limiting and any suitable dimensions or configuration of the segments may be used. A spacing or insulating region 507 is positioned between segments 566A, 566B, 566C, and 566D to electrically isolate the segments from one another. Each of the segments 566A, 566B, 566C, and 566D are connected to corresponding transimpedance amplifiers 573A, 573B, 573C, and 573D, as described below to output a voltage proportional to an induced current in each of the segments 566A, 566B, 566C, and 566D. In some examples, a single transimpedance amplifier or multiple transimpedance amplifiers may be used to determine a total charge on a droplet passing through aperture 564.

Figure 6:
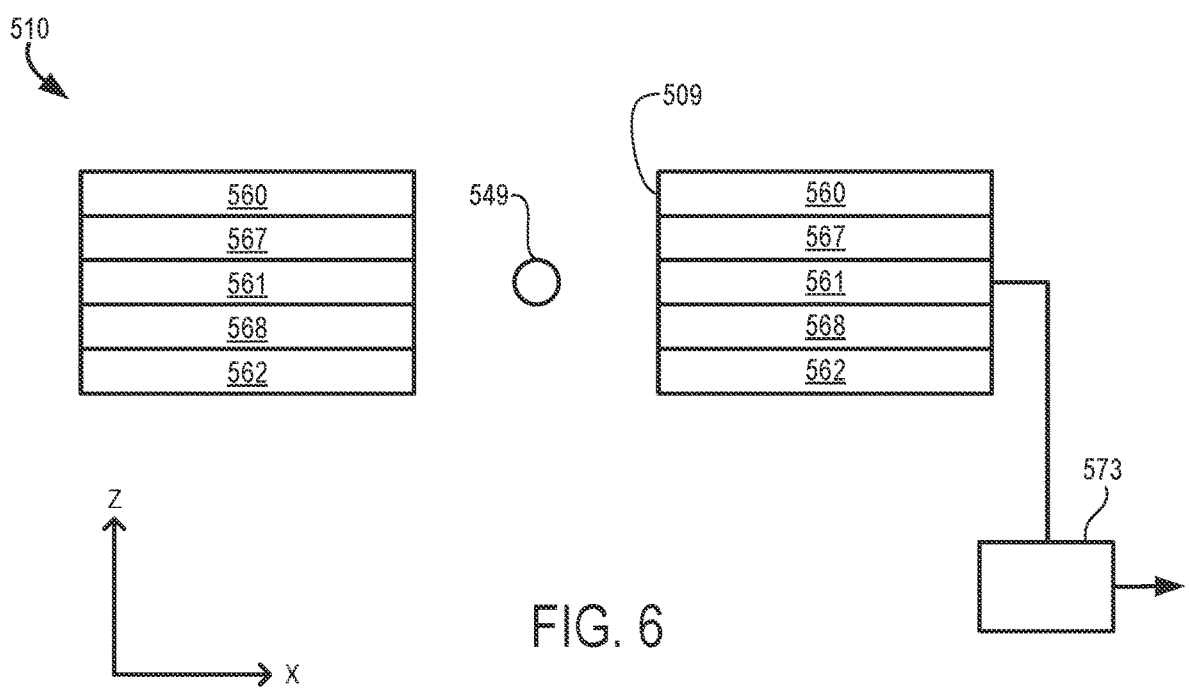
FIG. 6 illustrates a section view of a charged droplet detector showing electrical connections of the conductive layers, according to at least some examples.

FIG. 6 illustrates a section view of charged droplet detector 510 showing electrical connections of the sensor layer, according to at least some examples. The charged droplet detector 510 is shown having the same layers described with respect to FIG. 4 including three conductive layers 560, 561, and 562 separated by two insulating layers 567 and 568. In some embodiments, the total thickness of the charged droplet detector 510 is about 1 mm, though it may be greater than or less than 1 mm. The layers may all have a thickness of 200 micrometers (0.008 inches) in some embodiments. In some embodiments, the total thickness may be about 2 mm. The charged droplet detector 510 may be mounted between a charged droplet source and a target such that a droplet travels upward through the aperture 509.

A mount for X-Y-Z positioning the detector above a charged droplet source and alignment of the aperture 509 to the transducer axis is not shown.

For droplet sensing, the two conductive layers 560 and 562, as well as any other layers, such as sensor layer 561, can be electrically coupled to or biased on a reference voltage, such as a high voltage source and each of the segments 566A, 566B, 566C, and 566D of the sensor layer 561 can be electrically coupled to a circuit element, such as a transimpedance amplifier, for producing a signal, such as an induced current or voltage. Each of the conductive layers 560 and 562 and sensor layer 561 may optionally be biased to a high voltage to generate charge on droplets as they pass through the aperture 564, such as in the case of a droplet generator that does not generate charged droplets. In some examples, the high voltage may also be applied at the target using a wire mesh grid or be directly applied to an open port probe. As a droplet passes through the aperture 564, an electric field resulting from the voltage bias may apply force to charged droplets that may cause the droplets to accelerate, decelerate, and deflect the trajectory in an undesired manner. As such, a uniform electric field along the droplet trajectory is advantageous, such as a uniform field along an axis between the droplet generator and the target. In some examples, one or more of the conductive layers 560 and 562, or any other conductive layers, may be floated and/or at a reference (e.g., ground) voltage. Examples provided and described herein may include a fluid reservoir biased to a high potential while the charged droplet detector 510 is at a reference or ground potential. It will be understood that other implementations, such as biasing the charged droplet detector 510 to a high voltage may be used to induce a charge on the ejected droplet and be suitable for use with systems and methods described herein.

In some examples, each segment 566A, 566B, 566C, and 566D may be associated with a transimpedance amplifier which may optionally comprise one or more transimpedance amplifiers, though only one transimpedance amplifier 573 is shown in FIG. 6. For the example shown in FIG. 5, four transimpedance amplifiers 573A, 573B, 573C, and 573D are shown, with each coupled to a corresponding segment of sensor layer 561. In some examples the sensor layer 561 can be composed of any number of segments, with each coupled to a corresponding transimpedance amplifier or other circuit element. In some embodiments, the transimpedance unit 573 can include a Peltier cooled input transistor having feedback components, such as a Cf of 0.5 pF and an Rf of 1 giga-ohm. The integrating circuit of the transimpedance unit 573 transforms current in a segment of sensor layer 561 induced by the charged droplet 549 into a voltage output.

Figure 7:
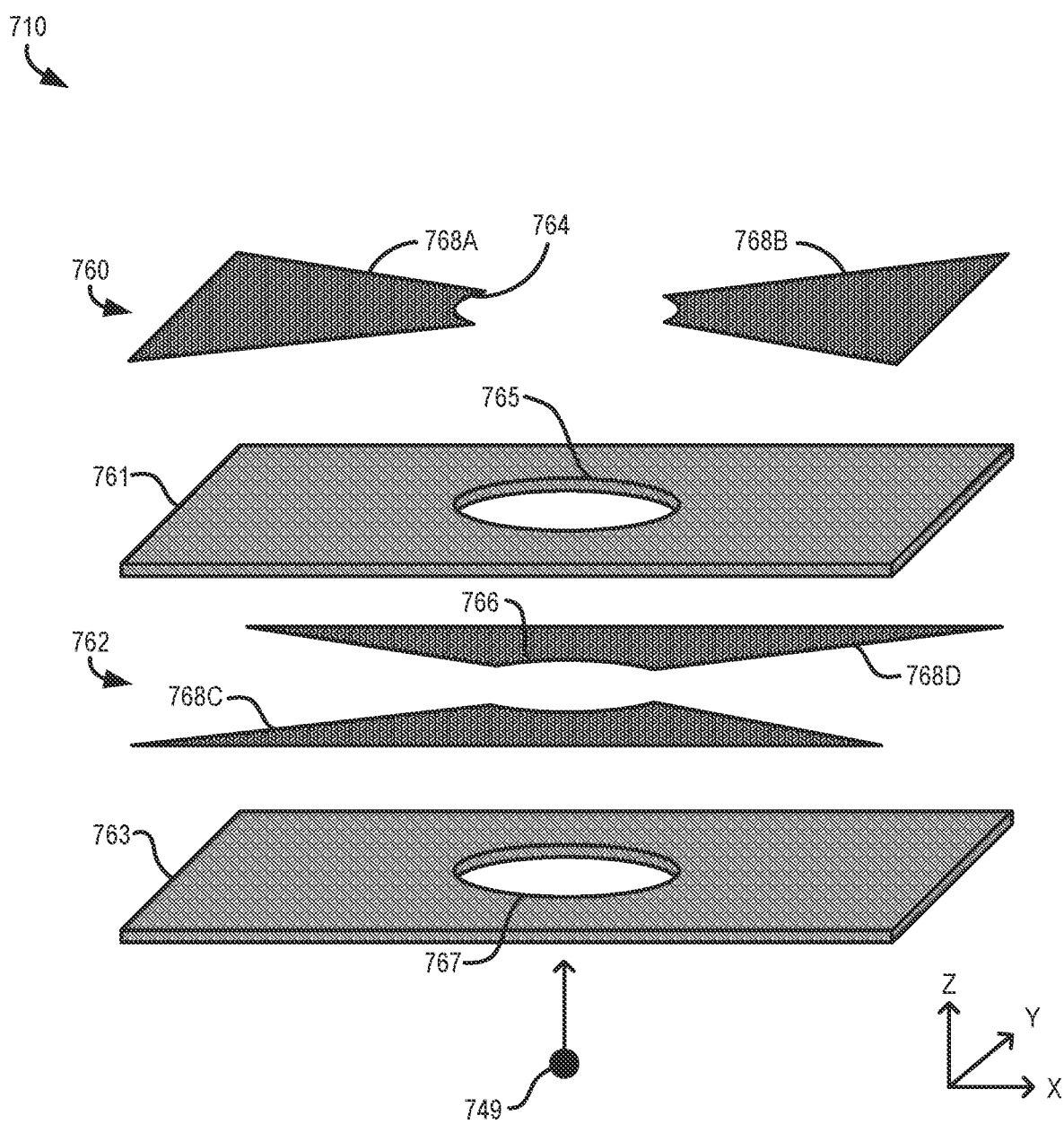
FIG. 7 illustrates an exploded view of layers of a charged droplet controller, according to at least some examples.

FIG. 7 illustrates an exploded view of layers of a charged droplet controller 710, according to at least some examples. Charged droplet controller 710 may correspond to one implementation of charged droplet management device 110 of FIG. 1. The charged droplet controller 710 includes a first conductive layer 760, a first support or insulating layer 761, a second conductive layer 762, and second support or insulating layer 763. Conductive layers of a charged droplet controller, which may be segmented, may be referred to herein as a conductive control layer. As a charged droplet 749 passes through an aperture of charged droplet controller 710, such as an aperture comprising or including the apertures 764, 765, 766, and 767, electric fields may be applied between opposing segments in a conductive layer 760 or 762, for example between segments 768A and 7688 of first conductive layer 760 and between segments 768C and 768D of second conductive layer 762.

The electric field may be applied by holding each of the opposing segments in a conductive layer at different relative voltages. As illustrated, segments 768A and 758B of first conductive layer 760 may generate an electric field along the X direction and induce a deflection of the charged droplet 749 along the X direction, while segments 768C and 768D of second conductive layer 762 may generate an electric field along the Y direction and induce a deflection of the charged droplet 749 alone the Y direction. Although segments 768A, 768B, 768C, and 768D are shown in FIG. 7 as positioned in separate conductive layers 762, in some charged droplet controllers the segments for modifying a trajectory of a charged droplet may all be positioned in the same plane or layer. Further, although four segments are shown, any suitable number of segments may be used and voltages between various segments may be adjusted to generate a suitable electric field that modifies a trajectory of the charged droplet as it passes through the aperture. Further, although two support or insulating layers 761 and 763 are depicted in FIG. 7, any suitable number of support or insulating layers may be used. For example, some configurations may not use any support or insulating layers (e.g., where a conductive layer provides its own supporting structure). Other examples may use only one support or insulating layer (e.g., where segments of a conductive layer are all in the same plane or layer and supported by a single support or insulating layer).

Optionally, additional conductive layers may be used in a charged droplet controller beyond those used for adjusting a trajectory of the charged droplet as it passes through the aperture. In some examples, one or more ground or reference conductive layers, similar to conductive layers 362 and 360 shown in FIG. 3, may be positioned above and/or below the primary conductive layer(s) including segments and used for modifying trajectories of charged droplets. Use of such ground or reference conductive layers may be useful for limiting the range of an electric field generated by a segmented conductive layer from extending significantly beyond the aperture. In sonic examples, all components of charged droplet controller may be biased at a relative potential above or below ground and/or relative to potentials at a droplet generator or target. The voltages applied at each of the segments may be controlled using one or more voltage controllers or voltage generators, which may be integrated as a portion of charged droplet controller 710 or may be provided by external circuitry.

Although conductive layers 760 and 762 are shown as planar in FIG. 7, while insulating layers 761 are shown with a particular thickness, any suitable thickness dimensions can be used. For example, insulating layers and; or conductive layers in a charged droplet controller may have thicknesses of from 0.1 mm to 5 mm, such as from 0.1 mm to 1.0 mm, or more, such as from 0.1 mm to 0.2 mm, from 0.2 mm to 0.3 mm, from 0.3 mm to 0.4 mm, from 0.4 mm to 0.5 mm, from 0.5 mm to 0.6 mm, from 0.6 mm to 0.7 mm, from 0.7 mm to mm, from 0.8 mm to 0.9 mm, from 0.9 mm to 1 mm, from 1 mm to 1.1 mm, from 1.1 mm to 1.2 mm, from 1.2 mm to 1.3 mm, from 1.3 mm to 1.4 mm, from 1.4 mm to 1.5 mm, from 1.5 mm to 1.6 mm, from 1.6 mm to 1.7 mm, from 1.7 mm to 1.8 mm, from 1.8 mm to 1.9 mm, from 1.9 mm to 2 mm, from 2 mm to 2.1 mm, from 2.1 mm to 2.2 mm, from 2.2 mm to 2.3 mm, from 2.3 mm to 2.4 mm, from 2.4 mm to 2.5 mm, from 2.5 mm to 2.6 mm, from 2.6 mm to 2.7 mm, from 2.7 mm to 2.8 mm, from 2.8 mm to 2.9 mm, from 2.9 mm to 3 mm, from 3 mm to 3.1 mm, from 3.1 mm to 3.2 mm, from 3.2 mm to 3.3 mm, from 3.3 mm to 3.4 mm, from 3.4 mm to 3.5 mm, from 3.5 mm to 3.6 mm, from 3.6 mm to 3.7 mm, from 3.7 mm to 3.8 mm, from 3.8 mm to 3.9 mm, from 3.9 mm to 4 mm, from 4 mm to 4.1 mm, from 4.1 mm to 4.2 mm, from 4.2 mm to 4.3 mm, from 4.3 mm to 4.4 mm, from 4.4 mm to 4.5 mm. from 4.5 mm to 4.6 mm, from 4.6 mm to 4.7 mm, from 4.7 mm to 4.8 mm, from 4.8 mm to 4.9 mm, from 4.9 mm to 5 mm. Thicknesses for conductive layers and insulating layers may extend outside of these ranges, in some cases, and particularly conductive layers may have thicknesses less than 0.2 mm or less than 0.1 mm. In some cases, a ratio of a diameter of the aperture to a thickness of one or more of the insulating layers may be from 0.25 to 4. In some cases, a. ratio of a diameter of the aperture to a thickness of one or more of the conductive layers may be from 0.25 to 4. Optionally, thicknesses for conductive layers may be dictated by manufacturing, such as in the case of a charged droplet management device comprising a printed circuit board, where copper foil or copper plating thicknesses may be standardized (e.g., copper layer thickness of about 35 µm, about 70 µm, about 105 µm, or about 140 µm). In some examples, the thicknesses of each insulating layer are the same, though they can optionally be different. In some examples, the thicknesses of each conductive layer (if multiple conductive layers are present) are the same, though they can optionally be different. In some examples, the thicknesses of conductive layers and insulating layers are different from each other, though they can optionally be the same. In some examples, use of conductive layers of thicknesses greater than 0.1 mm or 0.2 mm may be useful for imparting a stronger trajectory change to a charged droplet, as thicker conductive layers may allow for more time for the charged droplet to interact with an electric field. Such cases may be considered as the conductive layer having a cylindrical aperture, although segmented in some examples.

The strength of the electric fields generated between segments 768A and 768B of first conductive layer 760 and segments 768C and 768D of second conductive layer 762 may be dictated by the relative voltages of each segment or the voltage difference between opposing segments, for example. In some examples, any suitable voltage difference may he applied between opposing segments, though very high voltages may generate electric fields high enough to break down air and trigger an electrostatic discharge and such condition is desirably avoided. In some examples, relative voltages between different segments may be from 0 V to 500 V or more, depending on the geometries of the segments. Example relative voltages between different segments may be from 0 V to 25 V, from 0 V to 50 V, from 0 V to 75 V, from 0 V to 100 V, from 0 V to 125 V, from 0 V to 150 V, from 0 V to 175 V, from 0 V to 200 V, from 0 V to 225 V, from 0 V to 250 V, from 0 V to 275 V, from 0 V to 300 V, from 0 V to 325 V, from 0 V to 350 V, from 0 V to 375 V, from 0 V to 400 V, from 0 V to 425 V, from 0 V to 450 V, from 0 V to 475 V, or from 0 V to 500 V. It will be appreciated that the higher the voltage difference between segments, the stronger the electric field, and the bigger the trajectory adjustment.

Feedback mechanisms may be implemented in systems, techniques, devices, and methods described herein, such as to allow for the voltage applied to different segments of a charged droplet controller to be determined and selected based on a needed trajectory adjustment. For example, by measuring a charged droplet position, such as using a charged droplet detector as described herein, and using fixed or known geometry parameters for the system and target, the voltages needed for application to different segments in a charged droplet controller can be determined. For example, assuming a charged droplet detector and charged droplet controller have their apertures aligned with an ejection axis of a charged droplet generator, and further aligned with a target, a droplet that passes through the exact center of the apertures of the charged droplet detector and charged droplet controller will not require any trajectory adjustment, and so the voltages applied to the segments of the charged droplet controller can be selected generate a very small or zero electric field, such that no deflection to the trajectory will be applied. In another example, a droplet that is misdirected from the aperture center, passing closer to one segment than another, will have its position identified by a charged droplet detector, allowing for determination and selection of appropriate voltages to apply to segments of the charged droplet controller to modify the trajectory of the charged droplet so that it arrives on axis at the target. In some examples, a lookup table or fitted analytical solution may be used to generate the voltages to be applied to different segments of a charged droplet controller based on determined position of a charged droplet at a charged droplet detector.

Figure 8:
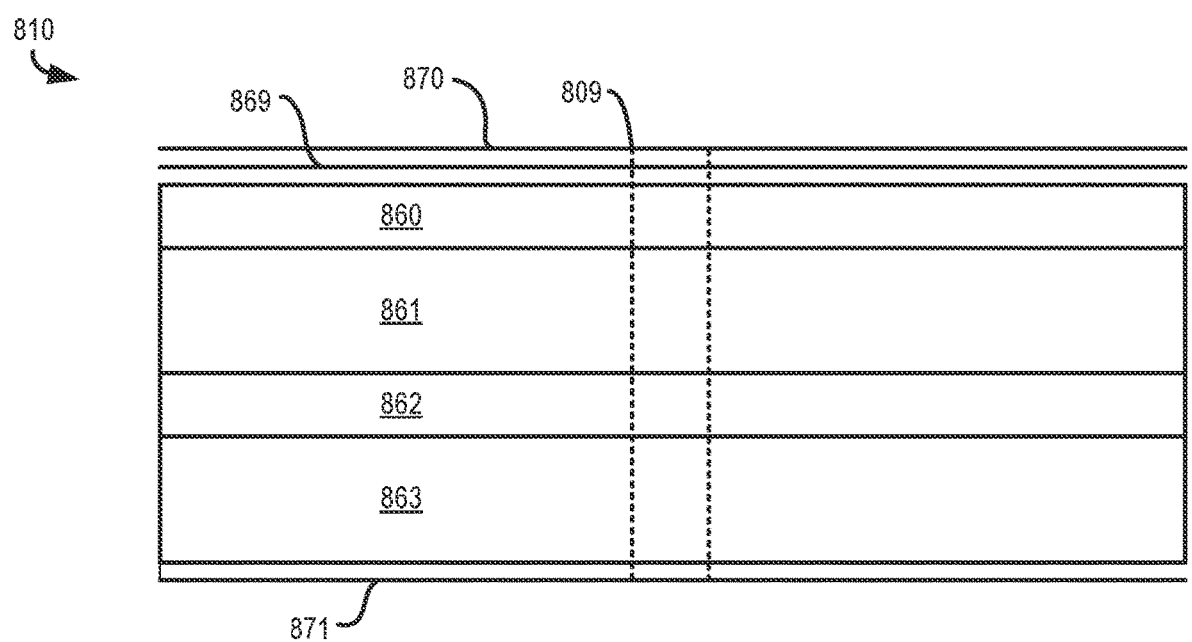
FIG. 8 illustrates a side view of a charged droplet controller, according to at least some examples.

FIG. 8 illustrates a side view of a charged droplet controller 810, which may be different from or the same as a component of charged droplet management device 110 of FIG. 1, charged droplet controller 210B of FIG. 2, or charged droplet controller 710 of FIG. according to at least some examples. The layers of the charged droplet controller 810 are shown, though additional layers may be implemented in some examples. In some examples, the charged droplet controller 810 may be or comprise a printed circuit board including a printed and/or silkscreened top layer 870, and soldermask layers 869 and 871. Within a printed circuit of the charged droplet controller 810 are conductive layers 860 and 862 as described above with reference to components of charged droplet controller 710 of FIG. 7. Insulating layers 861 and 863 are positioned between the conductive layers 860 and 862, such as to support and/or electrically isolate the conductive layers 860 and 862 from one another. All layers define an aperture 809 passing through charged droplet detector 810. The insulating layers 861 and 863 may have a thickness of between 0.1 millimeters and 1.0 millimeters, in some examples. Though the charged droplet controller 810 in FIG. 8 shows two total conductive layers and two total insulating layers, more or fewer conductive layers and/or insulating layers may be included, in other examples. In some examples, the layers, including the conductive layers 860 and 862 and the insulating layers 861 and 863, as well as any other layers, may be arranged in a nonparallel manner such that the layers are not along parallel planes. In sonic embodiments, the conductive layers 860 and 862 are or comprise copper or gold, for example. The conductive layers 860 and 862 may have any suitable lateral dimensions, such as from 0.5 cm to 5 cm (e.g. 0.5 cm, 0.6 cm, 0.7 cm, 0.8 cm, 0.9 cm, 1.0 cm, 1.1 cm 1.2 cm, 1.3 cm 1.4 cm, 1.5 cm, 2 cm, 2.5 cm, 3 cm, 3.5 cm, 4 cm, 4.5 cm, or 5 cm), though larger or smaller dimensions may be implemented. In some examples, the conductive layers 860 and 862, or components thereof such as segments of conductive layers 860 and 862, may have a larger lateral dimension than the insulating layers 861 and 863 to provide for electrical connections to one or more voltage controllers. The insulating layers 861 and 863 may be formed of a suitable dielectric and/or insulating material, such as a laminate (e.g., as used in some printed circuit boards).

Figure 9:
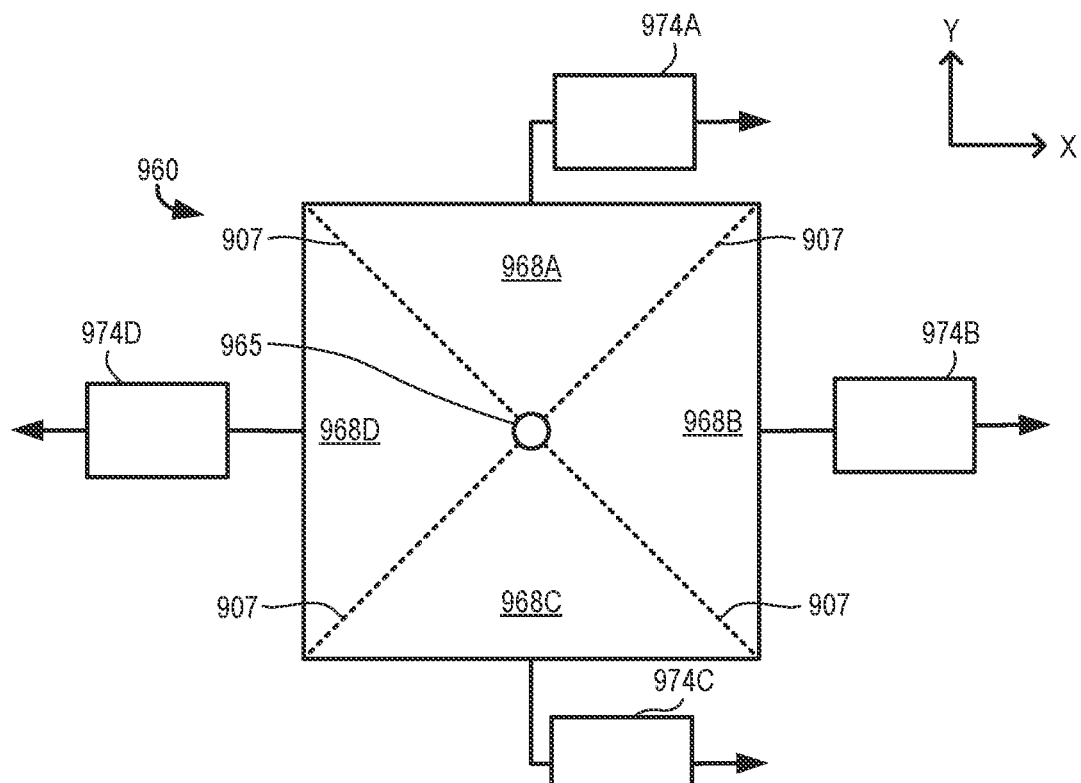
FIG. 9 illustrates a top plan view of a segmented conductive layer of a charged droplet controller, according to at least some examples.
Figure 10:
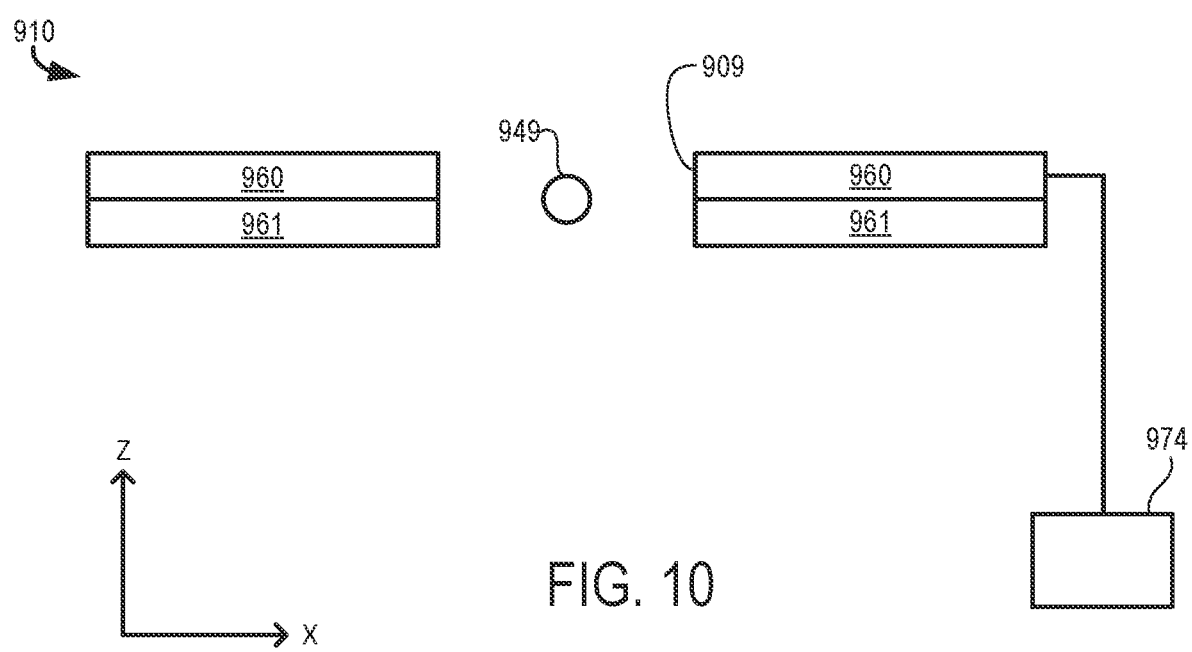
FIG. 10 illustrates a section view of a charged droplet controller showing electrical connections of the conductive layer, according to at least some examples.

FIG. 9 illustrates a top plan view of conductive layer 960 of a charged droplet controller 910, which may be the same as or different from a charged droplet controller of charged droplet management device 110 of FIG. 1, charged droplet controller 210B of FIG. 2, charged droplet controller 710 of FIG. 7, or charged droplet controller 810 of FIG. 8. according to at least some examples. The conductive layer 960 defines an aperture 965 which may be at least part of aperture 909 of the charged droplet controller 910 and may have a diameter of 2 mm, in some embodiments. In some examples the diameter may be greater than or less than 2 mm. The segments 968A, 968B, 968C, and 968D of the conductive layer 960 divide the layer into equal sized segments that surround the aperture 965, with each segment optionally providing an equal portion of the perimeter of the aperture 965. A spacing or insulating region 907 is positioned between segments 968A, 968B, 968C, and 968D to electrically isolate the segments from one another. Each of the segments 968A, 968B, 968C, and 968D are connected to corresponding voltage controllers 974A, 974B, 974C, and 974D, as described below to generate electric field(s) at aperture 965 of a desired or predetermined magnitude and orientation to modify a trajectory of a charged droplet 949 as it passes through aperture 965. In some examples, a single voltage controller or multiple voltage controllers may be used to apply voltages between different segments of conductive layer 960. Optionally, a single voltage controller may be connected between opposing segments to set a voltage difference between the opposing segments. For example, voltage controller 974A and 974C may be a same voltage controller to set a voltage difference between segments 968A and 968C or voltage controller 974B and 974D may be a same voltage controller to set a voltage difference between segments 968B and 968D. In some examples, each segment 968A, 968B, 968C, and 968D may be associated with a voltage controller which may optionally comprise one or more voltage controller, though only one voltage controller 974 is shown in FIG. 10. For the example shown in FIG. 9, four transimpedance amplifiers 974A, 974B, 974C, and 974D are shown, with each coupled to a corresponding segment of conductive layer 960.

FIG. 10 illustrates a section view of charged droplet controller 910 showing electrical connections of the conductive layers, according to at least some examples. The charged droplet controller 910 is shown having a different number and configuration of layers described with respect to FIG. 8 including one conductive layer 960 and one insulating layer 961. In some embodiments, the total thickness of the charged droplet controller 910 is about 0.4 mm, though it may be greater than or less than 0.4 mm. The layers may all have a thickness of 200 micrometers (0.008 inches) in some embodiments. In some embodiments, the total thickness may be about 0.8 mm. The charged droplet controller 910 may be mounted between a charged droplet source and a target such that a droplet travels upward through the aperture 909. A mount for X-Y-Z positioning the controller above a charged droplet source and alignment of the aperture 909 to a transducer axis is not shown.

For droplet control, a voltage difference applied between opposing segments 968A and 968C can be used to adjust a deflection of charged droplet along the Y direction and a voltage difference applied between opposing segments 968B and 968D can be used to adjust a deflection of charged droplet along the X direction. The voltages applied to segments of conductive layer 960 may be biased above or below a ground potential to establish an overall floated potential to charged droplet controller 910, which can be used to accelerate, decelerate, or maintain relative velocity of charged droplets approaching or departing from charged droplet controller 910. As a droplet passes through the aperture 965, an electric field generated by the voltages applied to the different segments may apply force to charged droplets that may cause trajectories of charged droplet 949 to accelerate, decelerate, and deflect in a controlled manner.

Figure 11:
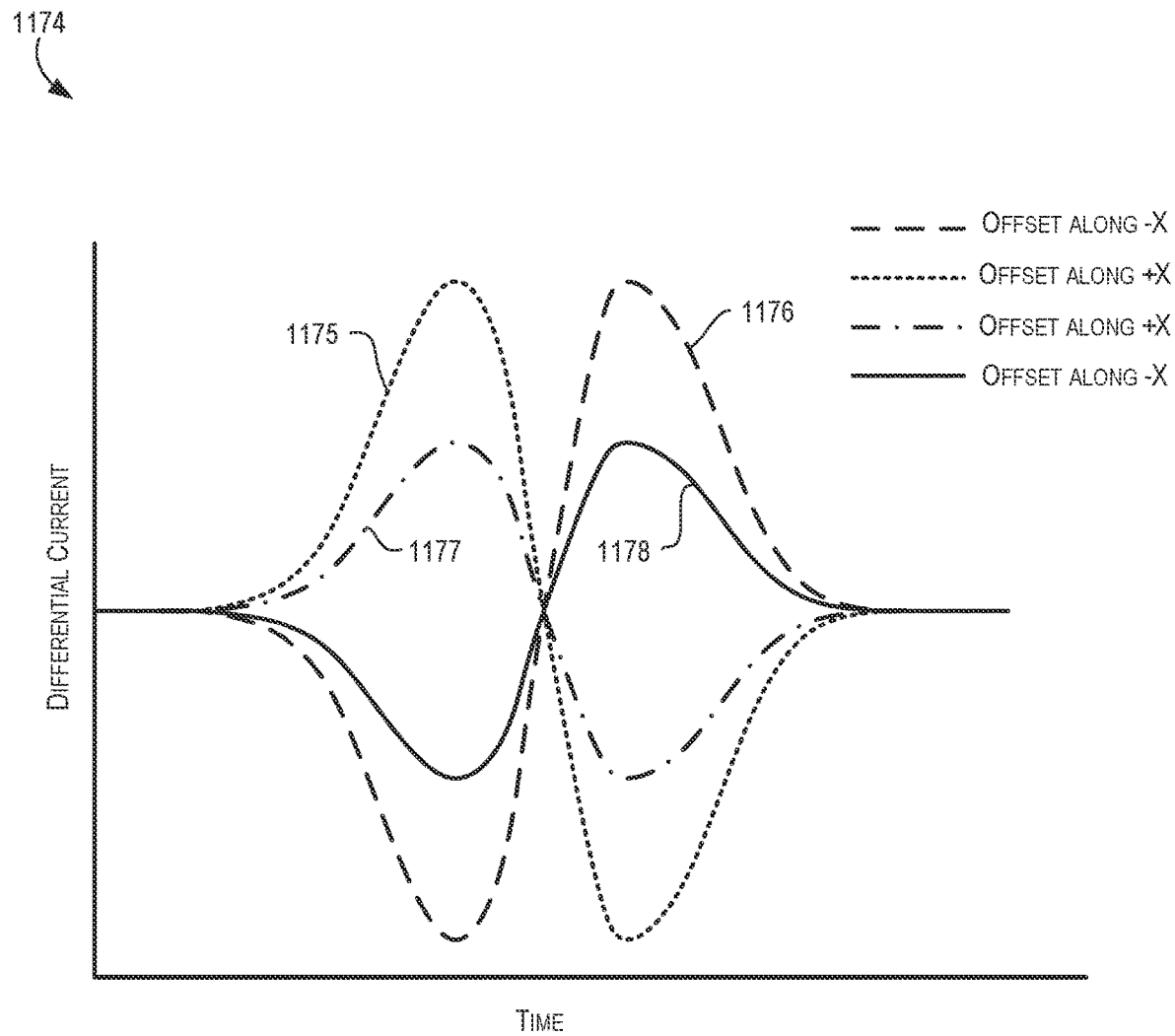
FIG. 11 illustrates a chart showing differential current from opposing segments of the segmented conductive layer for different droplet displacement locations along an axis between the opposing segments, according to at least some examples
Figure 12:
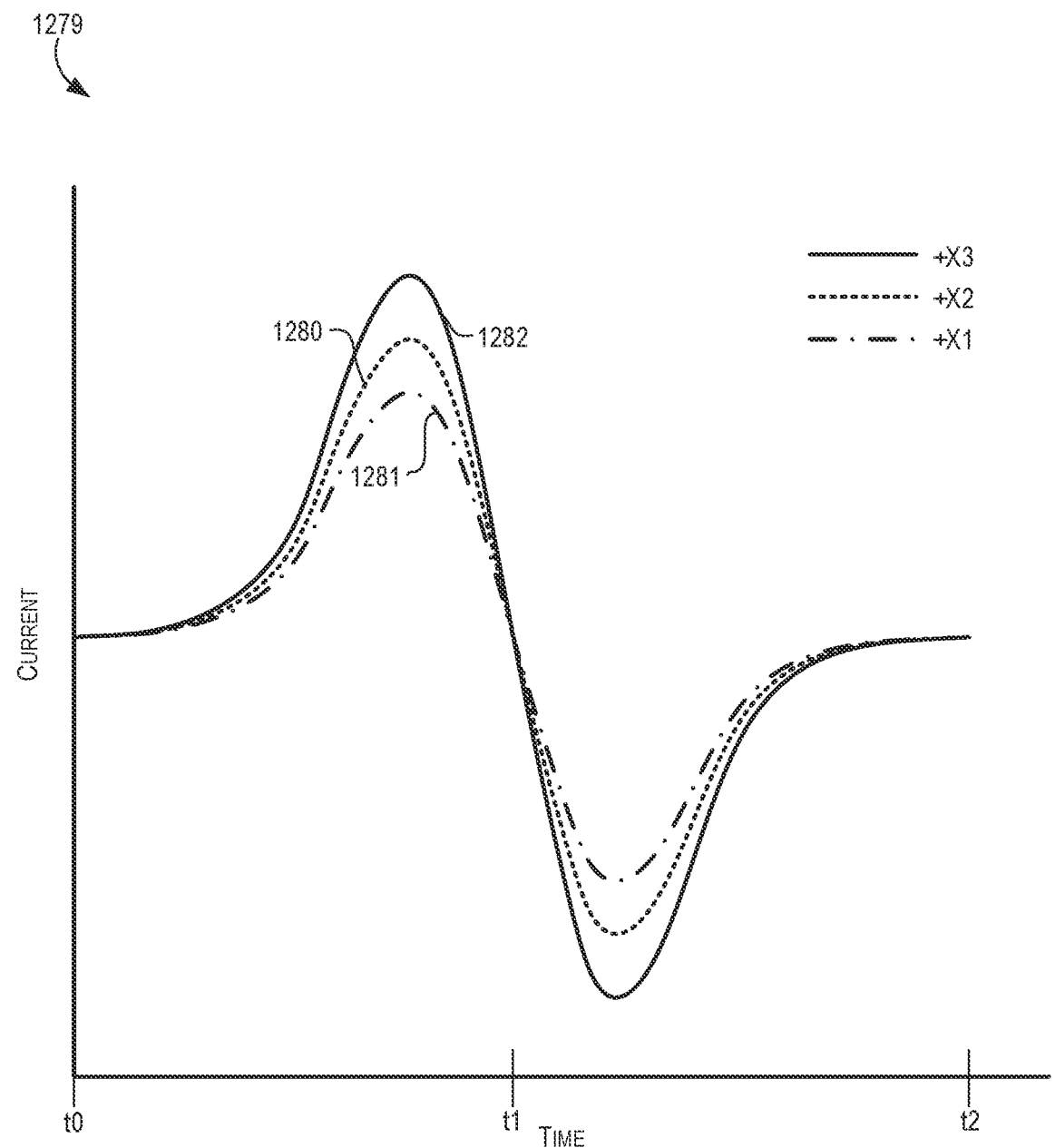
FIG. 12 illustrates a chart showing a current from a segment of the segmented conductive layer due to a charged droplet traveling through the aperture according to at least some examples.
Figure 13:
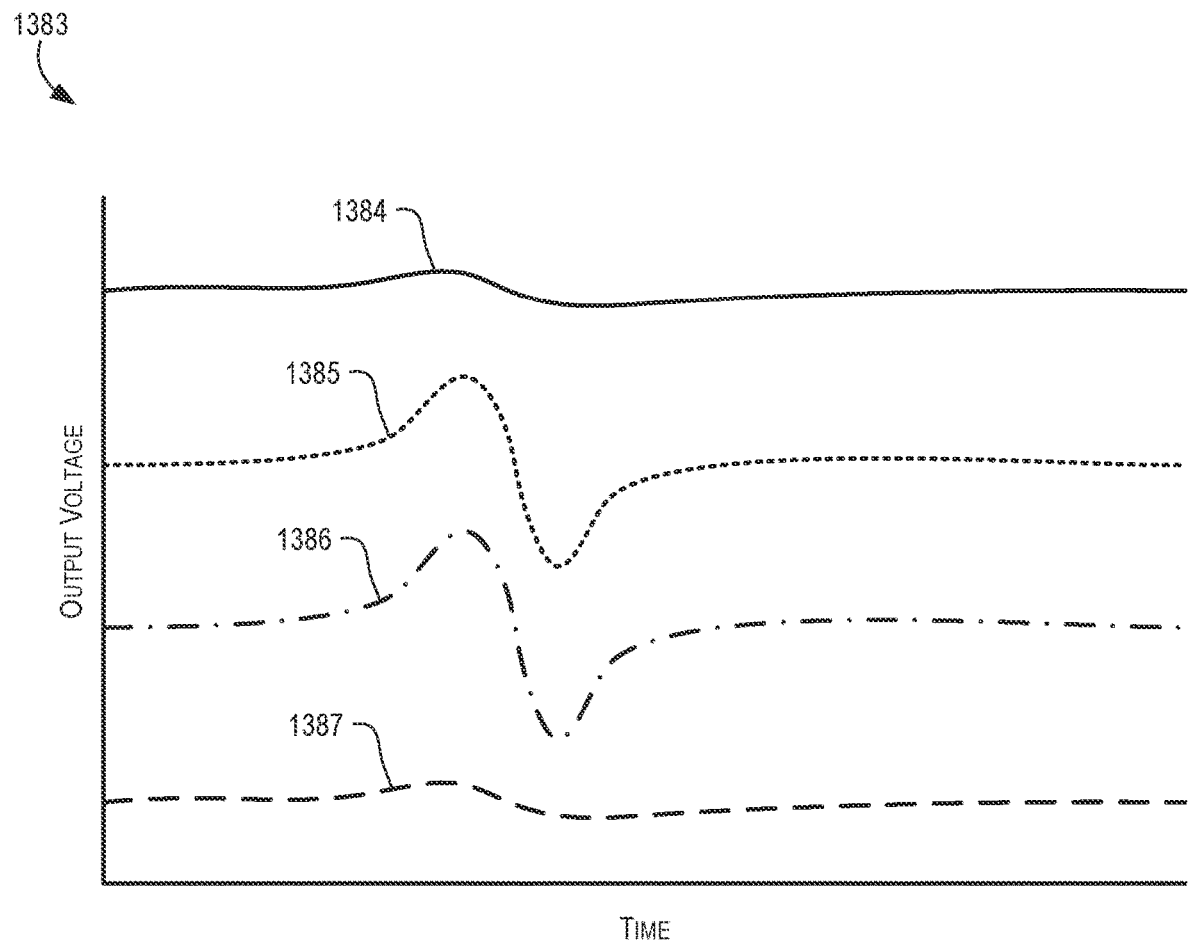
FIG. 13 illustrates voltage signals associated with outputs from transimpedance amplifiers in an example of a charged droplet placement within the aperture, according to at least some examples.

FIG. 11, FIG. 12, and FIG. 13 illustrate charts showing values corresponding to induced current in the different segments as a charged droplet passes through an aperture of a charged droplet detector. FIG. 11 shows differential current running through opposing segments and will be explained in further detail below. FIG. 12 illustrates a chart 1279 showing a current from a segment of a sensor layer of a charged droplet detector due to a charged droplet traveling through an aperture in the charged droplet detector over time, according to at least some examples. Each of the illustrated datasets 1282, 1281, and 1280 represent current measured in the segment as the charged droplet is ejected from a fluid reservoir through the aperture, and toward a target location. As illustrated, the datasets 1282, 1281, and 1280 represent current in the segment at different lateral offsets of the charged droplet from a segment of the sensor layer. For example, the dataset 1280 may represent a droplet passing through a center of the aperture while dataset 1282 is laterally offset nearer the segment of sensor layer and dataset 1281 is laterally offset away from the segment, on the opposite side of the aperture from the position associated with dataset 1282. As illustrated, the larger current as illustrated by dataset 1282 represents a charged droplet being positioned closer to the segment than a smaller current, such as illustrated by dataset 1281. At the left side of FIG. 12, each of the datasets 1280, 1281, and 1282 show an initial induced current at t0 indicative of no charged droplet being in the aperture. As the droplet passes the sensor layer of the charged droplet detector at t1, the current as represented by the datasets 1280. 1281, and 1282 passes the initial reference and reverses as the direction of the induced current is reversed until t2 when the droplet exits the aperture. Similarly, in FIG. 13, the output voltages from four transimpedance amplifiers are shown, with varying amplitudes based on the varying current values of the segments over time as a droplet passes through an aperture of a charged droplet detector. For example, the measured voltages depicted in chart 1383 in FIG. 13 indicate that a corresponding droplet passed through the charged droplet detector nearer to the segments associated with datasets 1385 and 1386 than the segments associated with datasets 1384 and 1387 (as evidenced by the larger fluctuation in voltage).

FIG. 11 illustrates a chart 1174 showing differential current from opposing segments of a sensor layer of a charged droplet detector for different charged droplet displacement locations along an axis between a droplet source and target destination of the droplet, according to at least some examples. In the chart 1174, the horizontal axis is time, as the signals are measured, which may be correlated to a vertical position (Z position) of the charged droplet while the differential current is shown on the vertical axis. Different datasets representing different signals are shown on chart 1174 corresponding to a difference in measured current between opposing segments, positioned on opposite sides of the aperture, as the charged droplet passes through the aperture.

A first dataset 1175 of the chart illustrates a difference in output voltage between opposing segments, such as segments 366B and 366D of FIG. 3 or segments 566B and 566D of FIG. 5, with a droplet whose trajectory is vertical but is offset laterally towards one of the segments from the center of the aperture. A corresponding set of curves from the difference in measured current between segments 366A and 366C of FIG. 3 or segments 566A and 566C of FIG. 5 would additionally yield information regarding the position of the droplet along a second direction (e.g., referencing FIG. 5, along the illustrated Y-axis), as it passes through the aperture and relative to the aperture center. If the droplet passed through the center of aperture in both directions (e.g., the X and Y directions illustrated in FIG. 5), all of the differential curves would be substantially flat, indicating a 0 V output. The outputs from each segment may be weighted or normalized with respect to a sum of the current through all the segments (normalizing out essentially the droplet charge from the differential measurement), or using weighting factors representative of an area of the segment or of a fraction of a perimeter of the aperture occupied by the segment. In some examples, the outputs may be normalized by dividing each output by a sum of all outputs from each sensor. In some examples, the summed signal from all segments, due to a droplet passing through the device, has the shape of a bipolar pulse. The magnitude of this summed signal can serve as an appropriate normalization factor for the differential currents. The polarity of the droplet charge may be extracted, by noting the phase of the bipolar pulse that is obtained from summing the sensor signals. A second dataset 1176 illustrates a difference in measured current between the segments with a droplet trajectory offset from a center axis of the aperture towards the second segment by the first amount in an opposite direction of the first dataset 1175. A third dataset 1177 illustrates a difference in measured current between the segments with a droplet offset towards the first of the segments along the first direction (e.g., along the X-axis illustrated in FIG. 5) by a second amount, less than the first amount, thereby resulting in less of a difference in measured current between the opposing segments. A fourth dataset 1178 of the chart 1174 illustrates a difference in measured current between the segments with a droplet offset from a center axis of the aperture towards the second segment by the second amount in an opposite direction of the third dataset 1177. The differential current from segments, when normalized as described above by the summed sensor signal, and with knowledge of the droplet charge polarity, also obtained from the summed sensor signal, may be used to determine the lateral offset of the droplet trajectory along the first directions (e.g., along the X-axis illustrated in FIG. 3 and FIG. 5). Similar analysis of the differential current from additional segments (e.g., perpendicular segments) can allow for the determination of the lateral offset of the droplet trajectors along the Y-axis of FIG. 3 and FIG. 5. The lateral offsets along the X and Y-axes may be used to generate a weighting identifying the location of the droplet such as a weighting map of the location of the droplet, the relative location of the droplet corresponding to a weighting of the current from the opposing segments.

The output voltages and/or the differential currents may be useful for identifying the location of charged droplets as well as velocity of the charged droplets. In some examples, the sum of all output voltages or currents may be used to determine droplet charge and droplet velocity (e.g., using sum 1494 of FIG. 14). In the chart 1174, the horizontal axis is time, as the signals are measured, which may be correlated to a vertical position (Z position) of the charged droplet while the differential current is shown on the vertical axis. The velocity may be determined based on a time to traverse the charged droplet detector, for example. Since the droplet travels through the device with essentially constant velocity, the position as shown in charts 1174 and 1279 is related to time, by the droplet velocity. In charts 1174 and 1279 there are three clear features to each of the curves: a peak, a minimum, and a zero crossing that occurs roughly midway between the peak and minimum. Respective times associated with each of these features are: $T_{peak}$, $T_{min}$, and $T_{zerocrossing}$. The time that the acoustic energy is sent out to the fluid surface to produce the droplet can be set as $T_0$. The droplet is in the plane of the sensor layer at time $T_{zerocrossing}$ (this is when the current is zero as the droplet reaches a minimum distance to each segment). Given the height of the sensor layer above the well fluid (which in general one will), calling this height $H_{sensor}$, then one measure of droplet velocity is determined with the equation: $H_{sensor}/(T_{zerocrossing}-T_0)$. This equation produces a velocity based on the time the droplet takes to get to the sensor layer from the fluid surface, knowing the height of the sensor layer above the fluid surface.

In some examples, droplet velocity may be measured based on a difference between $T_{peak}$ and $T_{min}$. This difference can be related to the droplet velocity and the distance between conductive layers (e.g., conductive layers 362 and 360 in FIG. 3), referenced herein as distance d. For an example geometry of conductive layers, the time $T_{peak}-T_{min}=0.71*d/v_{droplet}$, where $v_{droplet}$ is an 'instantaneous' velocity of the droplet as it passes through the sensor layer. Thus, the instantaneous velocity can be determined as $v_{droplet}=0.71*d/|T_{peak}-T_{min}|$. The factor of 0.71 comes from modeling of the device, but is strictly due to its geometry, and is independent of the droplet charge, volume, and other factors, and therefore for other geometries other factors may be used.

Figure 14:
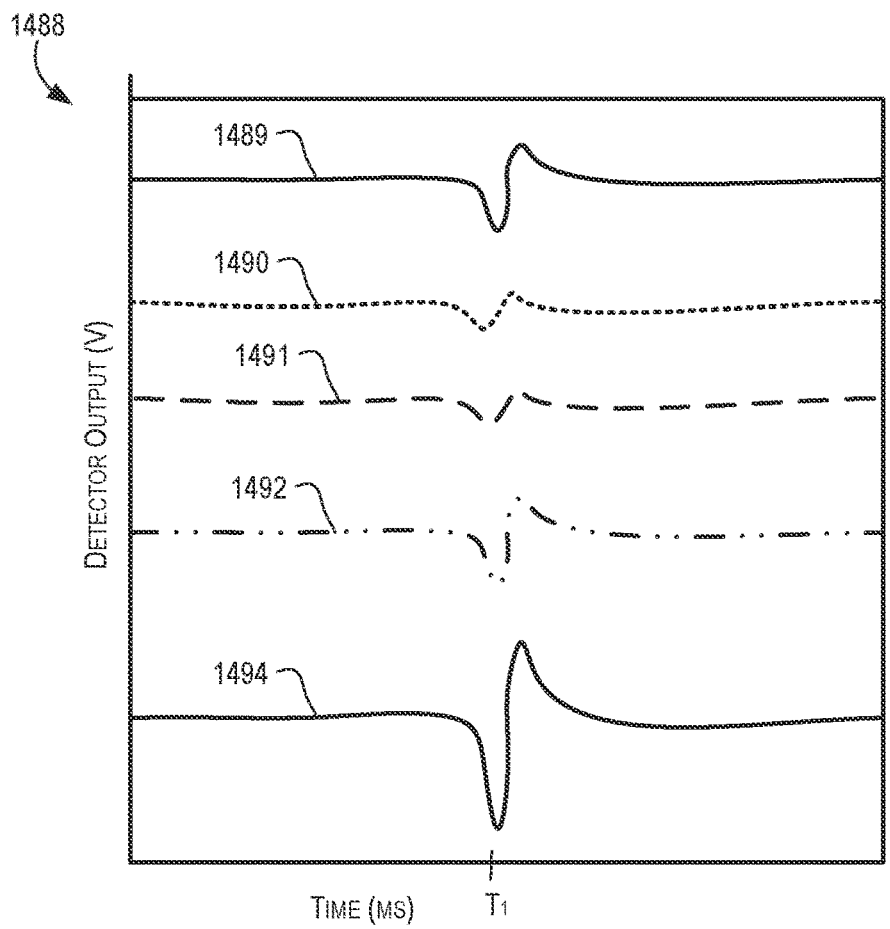
FIG. 14 illustrates voltage signals output showing detector signals for a droplet travelling through the aperture, according to at least some examples.
Figure 15:
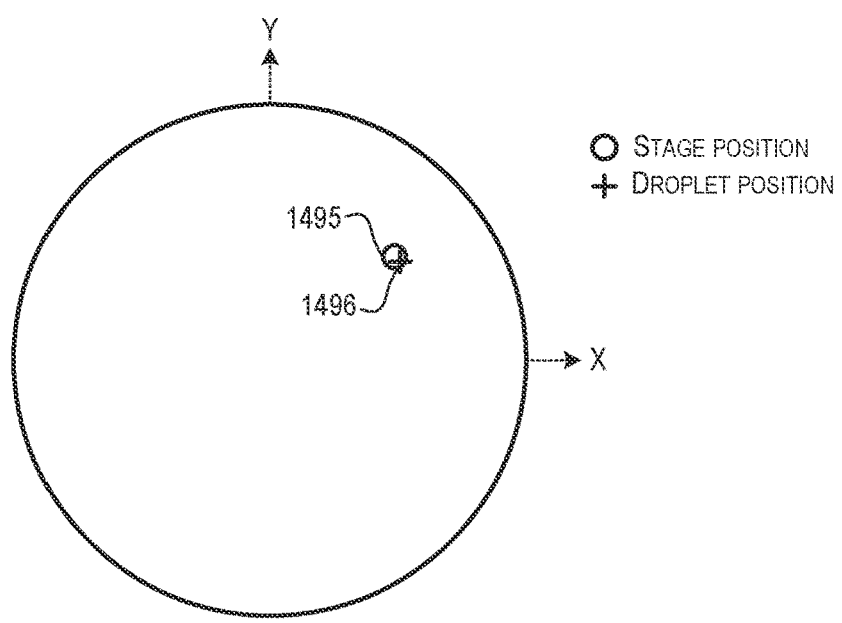
FIG. 15 illustrates a representation of the location of the droplet of FIG. 14, according to at least some examples.

FIG. 14 illustrates a chart 1488 showing output voltage signals 1489, 1490, 1491, and 1492 as well as a sum 1494 of all output voltage signals received from transimpedance amplifiers associated with four segments of a sensor layer, such as shown and described with respect to FIG. 5 above. The output voltage signals may be used to determine a location 1496 of a droplet travelling through the aperture in a sensor device, according to at least some examples. Using the output signals of chart 1488 and performing the calculations described herein, an inferred X-Y location 1496 of the droplet is determined and shown in FIG. 15. The inferred X-Y location 1.496 of the droplet corresponds to a predicted location (predicted using the output signals as described herein) where the droplet passes through the aperture, while the stage position X-Y location 1495 indicates a transducer axis defined by the position of a stage on which the transducer is placed, such as the transducer axis 118 of FIG. 1. That is, stage position X-Y location 1495 is where the droplet is expected to pass through the aperture, assuming the droplet trajectory is aligned along the axis of the acoustic transducer. As illustrated in FIG. 15, the inferred X-Y location 1496 and the stage position X-Y location 1495 coincide, thus validating the use of induced current to predict droplet location as described herein. As described above, induced current within segments of the sensor layer can be used to determine the position based on the relative size of the peaks of output voltage signals 1489, 1490, 1491, and 1492.

Figure 16:
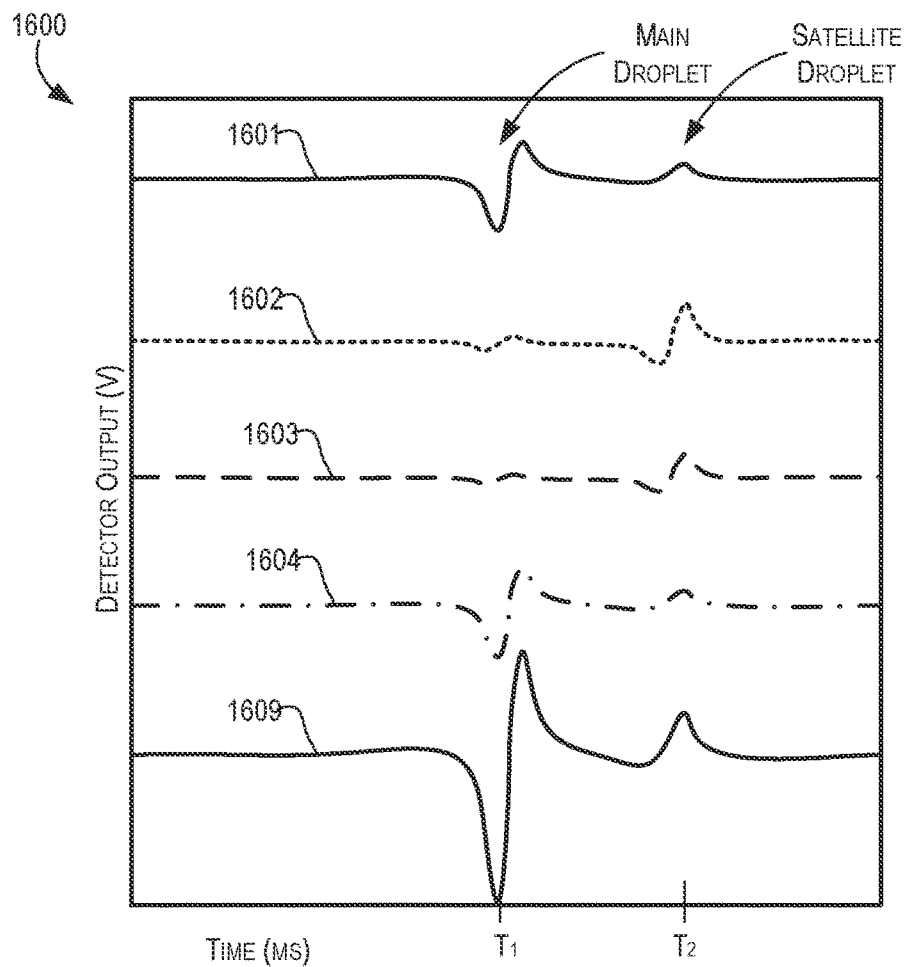
FIG. 16 illustrates voltage signals output showing detector signals for a main and a satellite droplet travelling through the aperture, according to at least some examples.
Figure 17:
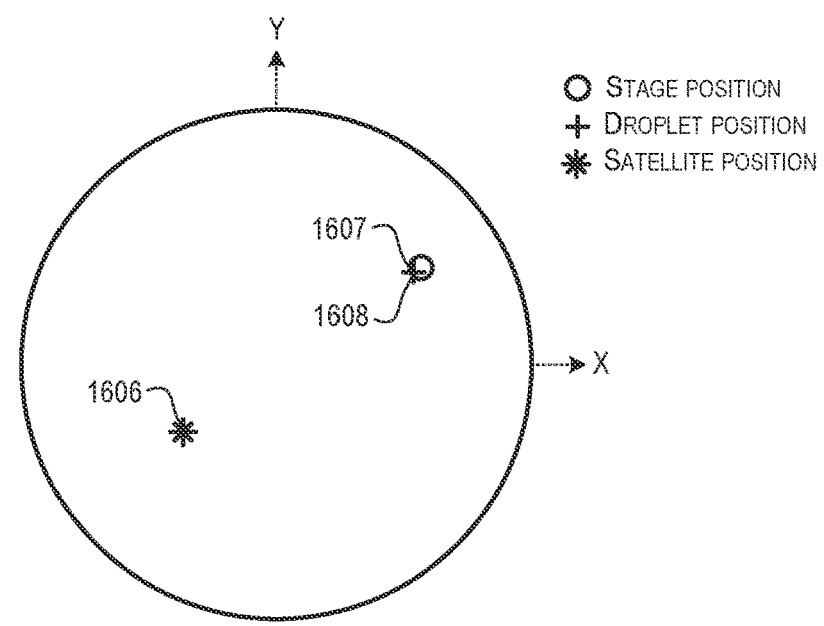
FIG. 17 illustrates a representation of the location of the main and the satellite droplet of FIG. 16, according to at least some examples.

FIG. 16 illustrates a chart 1600 providing output voltage signals 1601, 1602, 1603, and 1604 as well as a sum 1609 of all output voltage signals corresponding to a main droplet 1608 and a satellite droplet 1606 travelling through the aperture, according to at least some examples. The satellite droplet 1606 may be an undesired secondary droplet that may be ejected from the fluid during a given ejection and may be produced if the device is not tuned properly or is overpowered when the main droplet 1608 is produced. The resulting signals from four segments of the sensor layer as output from the transimpedance amplifiers are shown in FIG. 16 and inferred X-Y locations of the main droplet 1608 and satellite droplet 1606 are shown in FIG. 17, along with a stage position 1607. The locations of the main droplet 1608 and the satellite droplets 1606 are determined from induced current of segments of the sensor layer shown identifying peaks showing the locations of the main droplet 1608 and the satellite droplet 1606. The location of the satellite droplet 1606 may be determined based on relative amplitudes, for example to differentiate between the main droplet 1608 and the satellite droplet 1606. For example, in FIG. 16, the satellite droplet 1606 is identifiable at $T_2$ while the main droplet 1608 is at $T_1$ and is clearly identifiable based on the difference in the peaks of the dataset representing the sum 1609. In some embodiments, the identification of satellite droplets may be useful in determining whether ejection parameters (e.g., transducer parameters) need to be adjusted. For example, a method may include determining, based on measurements of values corresponding to induced current as described herein, that a satellite droplet has been ejected in a particular ejection. Based on this determination, it may be determined that transducer parameters need to be adjusted so as to prevent further ejection of satellite droplets. Transducer parameters may thus be adjusted (e.g., by reducing acoustic signal amplitude or frequency) for the next ejection. These steps may be repeated as often as necessary so as to provide iterative fine tuning of ejection and prevent or at least reduce the ejection of satellite droplets.

Figure 25:
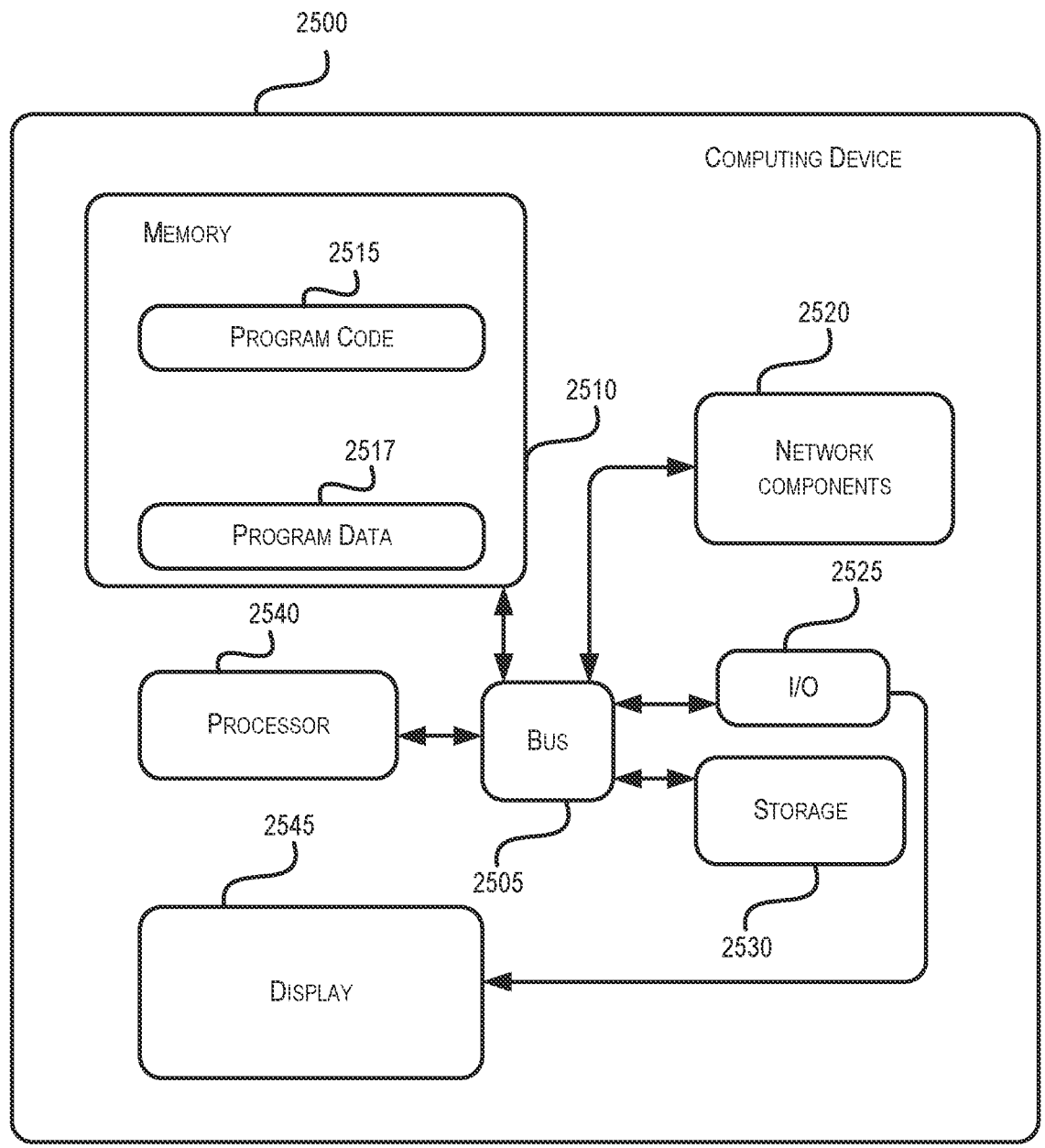
FIG. 25 illustrates a block diagram of an example of a computing device, according to some examples.

FIG. 18 illustrates a flow chart showing a process for detecting charged droplets from a droplet generator, according to at least some examples. Any suitable computing system or group of computing systems can be used for performing the aspects of the methods described herein. For example, FIG. 25 depicts an example of a computing device 2500 that may be at least a portion of a computing system to perform the operations or methods described herein.

At block 1802, the method 1800 includes positioning a charged droplet detector between a droplet generator and a target, such as shown in FIG. 1 and FIG. 2. The detector may be a component of charged droplet management device 110 of FIG. 1, charged droplet detector 210A of FIG. 2, charged droplet detector 310 of FIG. 3, charged droplet detector 410 of FIG. 4, or charged droplet detector 510 of FIG. 6, according to at least some examples, The charged droplet detector may be positioned with an aperture positioned in alignment with an ejection axis of a droplet generator (e.g., in alignment with a transducer axis of an acoustic droplet ejection system).

At block 1804, the method 1800 includes directing a charged droplet from the droplet generator toward the target through an aperture of the charged droplet detector. The Charged droplet may be propelled by the droplet generator as described with respect to FIG. 1, for example.

At block 1806, the method 1800 includes analyzing voltage signals generated by the charged droplet detector to determine a position and/or a velocity of the droplet. The voltage signals may be output by a transimpedance amplifier connected to a respective one of the segments of a sensor layer. The voltage signals may correspond to the induced current of each segment as a result of the passage of the charged droplet through the aperture. As described herein, the location of the droplet may be determined based on a weighting of the voltage signals from the segments of the sensor layer.

Figure 19:
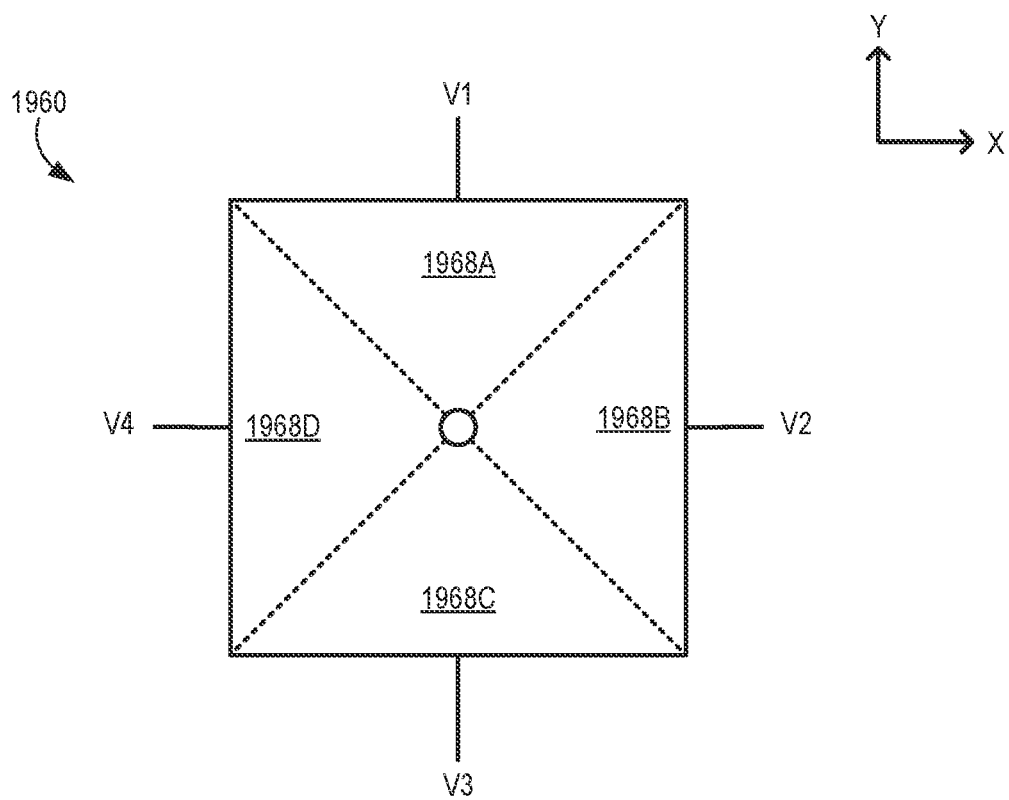
FIG. 19 illustrates a top plan view of conductive layer of a charged droplet controller, according to at least some examples.

FIG. 19 illustrates a top plan view of conductive layer 1960 of a charged droplet controller, which may be the same as or different from a charged droplet detector of charged droplet management device 110 of FIG. 1, charged droplet controller 210B of FIG. 2, charged droplet controller 710 of FIG, 7, charged droplet controller 810 of FIG. 8, or charged droplet controller 810 of FIG. 8, according to at least some examples. In FIG. 19, voltages V1, V2, V3, and V4 are shown as applied to segments 1968A, 1968B, 1968C, and 1968D, respectively of the conductive layer 1960.

Figure 20:
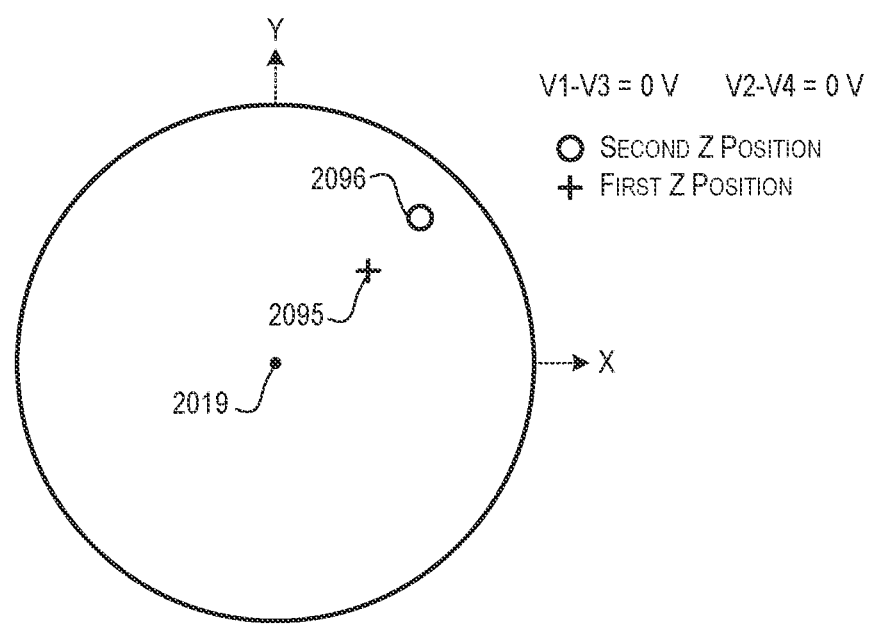
FIG. 20, FIG. 21, and FIG. 22 illustrate relative positions of charged droplets as measured by two charged droplet detectors on opposite sides of a charged droplet controller during steering of a charged droplet by application of different voltage differences between segments of the charged droplet controller.
Figure 21:
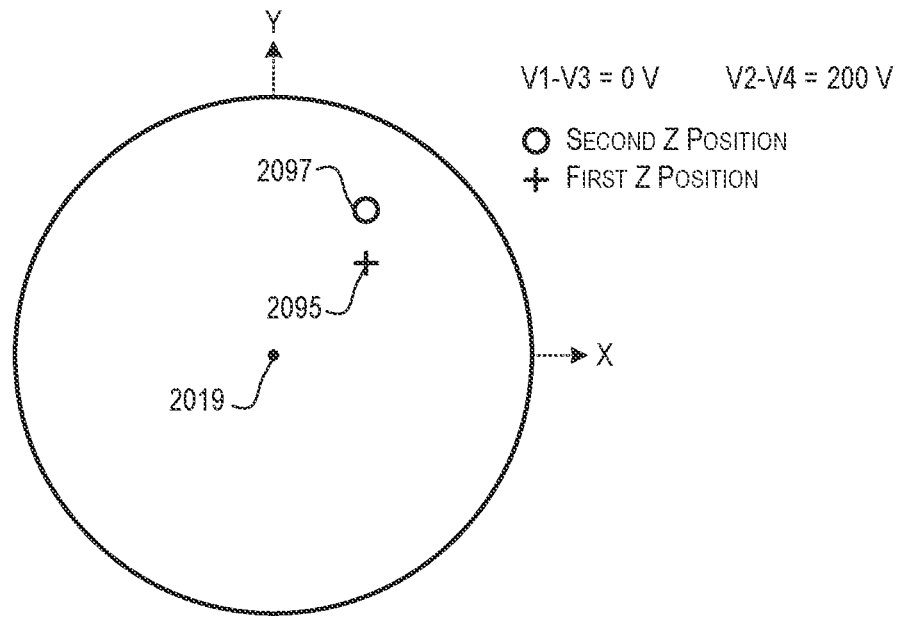
Figure 22:
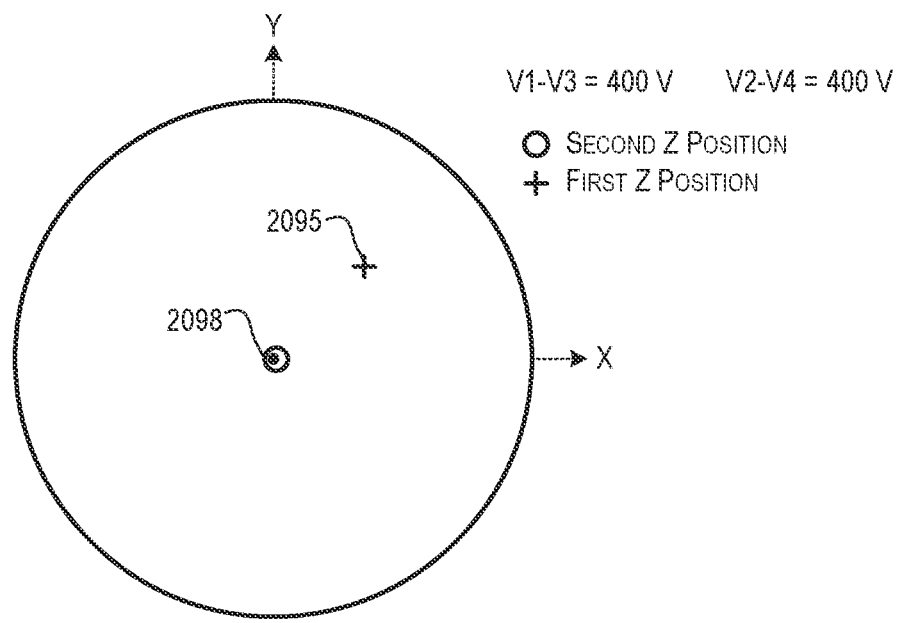

FIG. 20, FIG. 21, and FIG. 22 illustrates a relative position of a charged droplet at a first Z position (+) and at a second Z position (O), such as measured by two charged droplet detectors on opposite sides of a charged droplet controller, where voltages are applied to the segments 1968A, 1968B, 1968C, and 1968D of the charged droplet controller as in FIG. 19.

In FIG. 20, FIG. 21, and FIG. 22, the charged droplet's first Z position 2095 (+) is determined to be offset along both X and Y directions from a center 2019 of the aperture.

FIG. 20 shows a configuration where a voltage difference applied between segment 1968A and 1968C is zero (V1−V3=0 V) and a voltage difference applied between segment 1968B and 1968D is zero (V2−V4=0 V), indicating that the charged droplet controller is not deflecting the charged droplet. The charged droplet's second Z position 2096 (O) is shown in FIG. 20 to also deviate from the center 2019.

FIG. 21 shows a configuration where a voltage difference applied between segment 1968A and 1968C is zero (V1−V3=0 V) but a voltage difference applied between segment 1968B and 1968D is 200 V (V2−V4=200 V), indicating that the charged droplet controller is deflecting the charged droplet along the X direction but not along the Y direction. The charged droplet's second Z position 2097 (O) is shown in FIG. 21 to continue to deviate from the center 2019, but by a lesser extent in the X direction than in FIG. 20, indicating that the adjustment to the charged droplet's trajectory applied by the charged droplet controller is providing some correction to the trajectory but further corrections can make additional improvements.

FIG. 22 shows a configuration where a voltage differences applied between segment 1968A and 1968C is 400 V (V1−V3=400 V) and a voltage differences applied between segment 196813 and 1968D is 400 V (V2−V4=400 V), indicating that the charged droplet controller is deflecting the charged droplet along the X direction and the Y direction to an even greater extent than the X direction deflection in FIG. 21. The charged droplet's position 2098 (O) at the substrate under such voltage conditions is shown in FIG. 22 to be corrected very close to the center 2019. It will be appreciated that the voltages applied to the various segments referenced above for FIG. 20, FIG. 21, and FIG. 22 are merely examples and are not intended to be limiting. Any suitable voltages or voltage differences tier adjusting a trajectory of a charged droplet can be used, and such voltages or differences may be determined by the geometry of the system, the position and/or velocity of the charged droplet, and/or the desired change in trajectory (including magnitude and direction).

FIG. 23 illustrates a flow chart showing a process for controlling charged droplets ejected from a droplet generator, according to at least some examples. Any suitable computing system or group of computing systems can be used for performing the aspects of the methods described herein. For example, FIG. 25 depicts an example of a computing device 2500 that may be at least a portion of a computing system to perform the operations or methods described herein.

At block 2302, the method 2300 includes positioning a charged droplet controller between a droplet generator and a target, such as shown in FIG. 1 and FIG. 2. The charged droplet controller may be a component of charged droplet management device 110 of FIG. 1, charged droplet controller 210B of FIG. 2, charged droplet controller 710 of FIG. 7, charged droplet controller 810 of FIG. 8, or charged droplet controller 910 of FIG. 10, according to at least some examples. The charged droplet controller may be positioned with an aperture positioned in alignment with an ejection axis of a droplet generator (e.g., in alignment with a transducer axis of an acoustic droplet ejection system).

At block 2304, the method 2300 includes directing a charged droplet from the droplet generator toward the target through an aperture of the charged droplet controller. The charged droplet may be propelled by the droplet generator as described with respect to FIG. 1.

At block 2306, the method 2300 includes determining and applying voltages to segments of one or more conductive layers of the charged droplet controller to modify a. trajectory of the droplet. The voltages may generated automatically or by using feedback of a velocity or position of the charged droplet as determined by a charged droplet detector, for example. In other examples, voltages may be empirically determined and applied, such as to control trajectory of additional droplets by user input to tune or optimize droplet trajectory to reach or improve arrival at the target.

Figure 24:
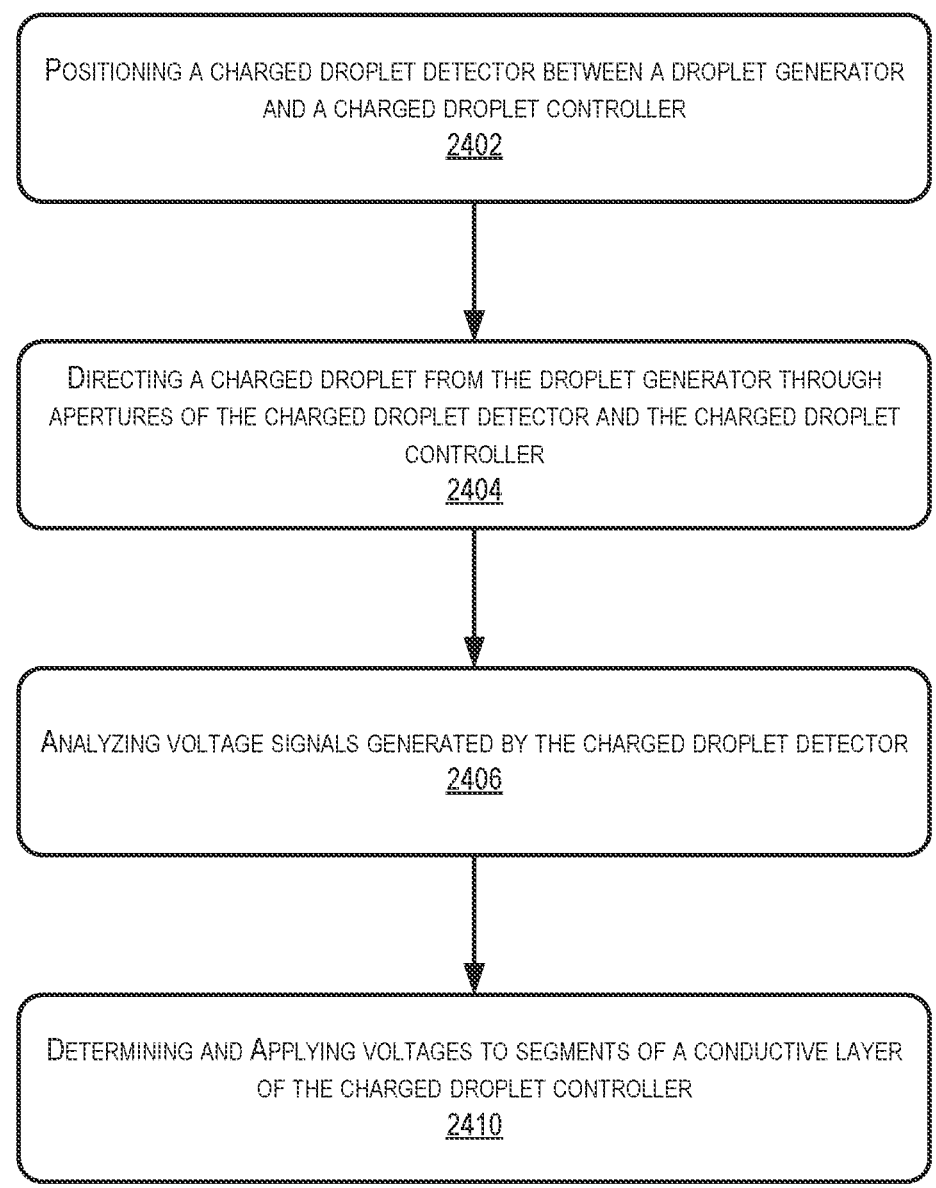
FIG. 24 illustrates a flow chart showing a process for detecting and controlling charged droplets ejected from a droplet generator using a feedback mechanism, according to at least some examples.

FIG. 24 illustrates a flow chart showing a process for detecting and controlling charged droplets ejected from a droplet generator using a feedback scheme, according to at least some examples. Any suitable computing system or group of computing systems can be used for performing the aspects of the methods described herein. For example, FIG. 25 depicts an example of a computing device 2500 that may be at least a portion of a computing system to perform the operations or methods described herein.

At block 2402, the method 2400 includes positioning a charged droplet detector between a droplet generator and a charged droplet controller, such as shown in FIG. 2. The charged droplet detector may be a component of charged droplet management device 110 of FIG. 1, charged droplet detector 210A of FIG. 2, charged droplet detector 310 of FIG. 3, charged droplet detector 410 of FIG. 4, or charged droplet detector 510 of FIG. 6, according to at least some examples. The charged droplet controller may be a component of charged droplet management device 110 of FIG. 1, charged droplet controller 210B of FIG. 2, charged droplet controller 710 of FIG. 7, charged droplet controller 810 of FIG. 8, or charged droplet controller 910 of FIG. 10, according to at least some examples. The charged droplet detector and charged droplet controller may be positioned with aperture in alignment with one another and/or with an ejection axis of a droplet generator e.g., in alignment with a transducer axis of an acoustic droplet ejection system).

At block 2404, the method 2400 includes directing a charged droplet from the droplet generator toward through apertures of the charged droplet detector and charged droplet controller. The charged droplet may be propelled by the droplet generator as described with respect to FIG. 1.

At block 2406, the method 2400 includes analyzing voltage signals generated by the charged droplet detector to determine a position and/or a velocity of the droplet. The voltage signals may be output by a transimpedance amplifier connected to a respective one of the segments of a sensor layer of the charged droplet detector. The voltage signals may correspond to the induced current of each segment as a result of the passage of the charged droplet through the aperture. As described herein, the location of the droplet may be determined based on a weighting of the voltage signals from the segments of the sensor layer. In some examples, voltage waveforms from the transimpedance amplifier may be analyzed by signal processing components to extract the position and/or velocity of the charged droplet at the charged droplet detector.

At block 2410, the method 2400 includes determining and applying voltages to segments of one or more conductive layers of the charged droplet controller to modify a. trajectory of the droplet. The voltages are determined using a velocity or position of the charged droplet from the signal processing components, and may, for example, be determined using a look-up table or analytical function, such as where one or more coordinates (e.g., X and Y) of the charged droplet are taken as inputs and voltages for application to the segments (or voltage differences for application to segments opposite one another) are determined as outputs for application to the segments of a conductive layer.

FIG. 25 illustrates a block diagram of an example of a computing device 2500. Computing device 2500 can be any of the described computers herein including a computing device that carries out the method 1800 and receives signals from one or more transimpedance amplifiers, for example, the method 2300, the method 2400, other methods described herein, or various aspects or portions of such methods. The computing device 2500 can be or include, for example, an integrated computer, a laptop computer, desktop computer, tablet, server, or other electronic device.

The computing device 2500 can include a processor 2540 interfaced with other hardware via a bus 2505. A memory 2510, which can include any suitable tangible (and non-transitory) computer readable medium, such as RAM, ROM, EEPROM, or the like, can embody program components (e.g., program code 2515) that configure operation of the computing device 2500. Memory 2510 can store the program code 2515, program data 2517, or both. In some examples, the computing device 2500 can include input/output ("I/O") interface components 2525 (e.g., for interfacing with a display 2545, keyboard, mouse, and the like) and additional storage 2530.

The computing device 2500 executes program code 2515 that configures the processor 2540 to perform one or more of the operations described herein. Examples of the program code 2515 include, in various examples, logic for the flowcharts described with respect to FIGS. 18, 23, and 24 above. The program code 2515 may be resident in the memory 2510 or any suitable computer-readable medium and may be executed by the processor 2540 or any other suitable processor.

The computing device 2500 may generate or receive program data 2517 by virtue of executing the program code 2515. For example, sensor data, trip counter, authenticated messages, trip flags, and other data described herein are all examples of program data 2517 that may be used by the computing device 2500 during execution of the program code 2515.

The computing device 2500 can include network components 2520. Network components 2520 can represent one or more of any components that facilitate a network connection. In some examples, the network components 2520 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network), in other examples, the network components 2520 can be wired and can include interfaces such as Ethernet, USB, or IEEE 1394.

Although FIG. 25 depicts a computing device 2500 with a processor 2540, the system can include any number of computing devices and any number of processors. For example, multiple computing devices or multiple processors can be distributed over a wired or wireless network (e.g., a Wide Area Network, Local Area Network, or the Internet). The multiple computing devices or multiple processors can perform any of the steps of the present disclosure individually or in coordination with one another.

Aspects of the invention can be further understood by reference to the following non-limiting examples.

Example 1: Charged Droplet Ejection, Detection, and Control System

Figure 26:
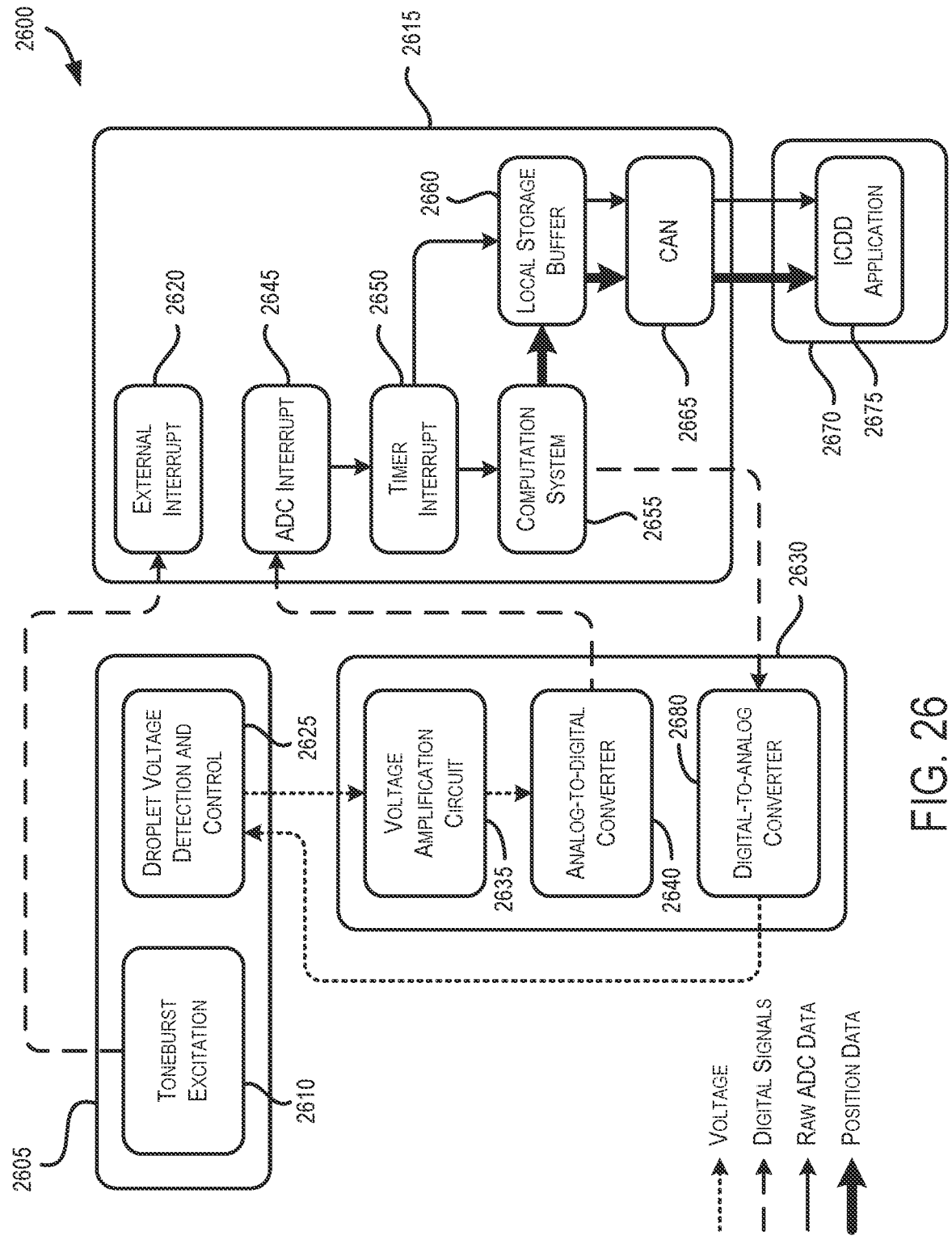
FIG. 26 provides an overview of an example charged droplet ejection, detection, and control system, according to some examples.

FIG. 26 provides an overview of an example charged droplet ejection, detection, and control system 2600, in accordance with some examples. System 2600 may include components described elsewhere in this disclosure, including one or more droplet generators, such as droplet generator 101 described with reference to FIG. 1 and FIG. 2, one or more charged droplet management devices, such as charged droplet management device 110 of FIG. 1, one or more charged droplet detectors, such as charged droplet detector 210A of FIG. 2, charged droplet detector 310 of FIG. 3, charged droplet detector 410 of FIG. 4, or charged droplet detector 510 of FIG. 6, one or more charged droplet controllers, such as charged droplet controller 21013 of FIG. 2, charged droplet controller 710 of FIG. 7, charged droplet controller 810 of FIG. 8, or charged droplet controller 910 of FIG. 10, and one or more computing devices, such as computing device 2500.

System 2600, as illustrated in FIG. 26 includes a charged droplet control and detection system 2605. Charged droplet control and detection system 2605 may include physical hardware including a droplet generator and a charged droplet management device, for example. As described above with reference to FIG. 1, the droplet generator of charged droplet control and detection system may include an acoustic droplet ejection system that employs toneburst excitation 2610 for driving an acoustic generator to eject droplets.

Charged droplet control and detection system 2605 may be in data communication with and/or control communication with data collection system 2615, which may comprise one or more computing devices in accordance with examples described herein. As illustrated, digital signals associated with toneburst excitation 2610 may be communicated to an external interrupt 2620 of data collection system 2615, which may allow data collection system 2615 to determine the time at which droplets are generated by charged droplet control and detection system 2605.

A charged droplet detector of charged droplet control system may generate voltages representative of the proximity of an ejected charged droplet to segments of a sensor layer, as described above, and droplet voltage detection and control 2625 may communicate such voltages to voltage control and collection system 2630. Specifically, the voltages may be communicated to a voltage amplification circuit 2635 which then sends the amplified voltages to an analog-to-digital converter 2640 to transform the voltages to a digital signal for communication to data collection system 2615.

At data collection system 2615, the digital signal representing the voltages can be received at an analog-to-digital (ADC) interrupt 2645 or other digital input system. ADC interrupt 2645 can extract the raw ADC data and communicate it to a timer interrupt 2650 and or a computation system 2655. Computation system 2655 may analyze the raw ADC data to generate position data for the charged droplet at charged droplet detector. Timer interrupt 2650 may use information from external interrupt 2620, for example, to determine timing information for detection of the charged droplet. Such timing information and the position data may be used by computing system 2655 to determine a velocity or trajectory for the charged droplet. The raw ADC data and position data may be communicated to local storage buffer 2660 to cache and/or store the data locally within data collection system 2615. A controller area network (CAN) bus 2665, or other input/output system, may receive the position data and/or raw ADC data from the local storage buffer 2660 or computation system 2655 and communicate the information to a user computing device 2670, such as to be used by an induced charge droplet detection (ICDD) application 2675 executing thereon.

For droplet trajectory control, computation system 2655 may analyze the position data and determine a set of voltages appropriate to apply to a segments of a control layer of a charged droplet controller in charged droplet control and detection system 2605. The voltages may be communicated in digital form, for example, to voltage control and collection system 2630, where a digital-to-analog converter 2680 can generate voltages that are communicated to droplet voltage detection and control 2625 to effect modification of droplet trajectory.

The subject matter of examples of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the interest of clarity, not all of the routine features of the examples described herein are shown and described. It will, of course, be appreciated that in the development of any such actual implementation, numerous implementation-specific decisions need to be made in order to achieve the developer's specific goals, such as compliance with application and business-related constraints, and that these specific goals will vary from one implementation to another and from one developer to another.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art. It will be apparent to those skilled in the art that various modifications and variations can be made in the method and system of the present invention without departing from the spirit or scope of the invention. Thus, it is intended that the present invention include modifications and variations that are within the scope of the appended claims and their equivalents. It is to be understood that any workable combination of the features and capabilities disclosed herein is also considered to be disclosed.

What is claimed is:

1. A device for detecting or controlling charged droplets from a charged droplet generator, the device comprising:
   a sensor element having three or more conductive layers separated by insulating layers, the conductive layers and insulating layers defining an aperture of the sensor element through which charged droplets pass, wherein an internal layer of the three or more conductive layers is a segmented conductive layer having a plurality of divided segments electrically independent from one another and arranged about a perimeter of the aperture at the segmented conductive layer; and
   a circuit element electrically coupled to each of the divided segments, wherein each divided segment of the plurality of divided segments is positioned to provide an induced current in the circuit element as a charged droplet passes through the aperture, the circuit element configured to generate signals proportional to the induced current.

2. The device of claim 1, wherein each of the plurality of divided segments is positioned at a corresponding portion of the perimeter of the aperture.

3. The device of claim 1, wherein each of the plurality of divided segments occupies an equal portion of the perimeter of the aperture as one or more other divided segments.

4. The device of claim 1, wherein the plurality of divided segments comprises at least two pairs of divided segments, wherein divided segments of a pair of divided segments are arranged opposite to one another about the aperture.

5. The device of claim 1, wherein the sensor element is positioned between a source and a target destination of a charged droplet generator.

6. The device of claim 1, wherein outer conductive layers of the three or more conductive layers are held at ground or a reference electrical potential.

7. The device of claim 1, wherein the circuit element comprises a transimpedance amplifier.

8. The device of claim 1, further comprising:
   a processor; and
   a non-transitory computer-readable storage medium in data communication with the processor, the non-transitory computer-readable storage medium storing processor executable instructions that, when executed by the processor, cause the processor to perform operations including:
   receiving the signals from the circuit element, and
   determining a position of a charged droplet based on the signals.

9. The device of claim 8, wherein determining the position of the charged droplet includes:
   weighting each signal from the plurality of divided segments to determine normalized signals; and
   determining the position of the charged droplet based on magnitudes of the normalized signals.

10. The device of claim 8, wherein the operations further include determining one or more of:
    an arrival time of the charged droplet at the aperture; a velocity of the charged droplet; and
    a charge to volume ratio for the charged droplet; or a presence of one or more charged satellite droplets.

11. The device of claim 1, wherein the signals proportional to the induced current comprise voltage signals.

12. The device of claim 1, further comprising a control element having a conductive control layer adjacent to one or more insulating layers, the conductive control layer and one or more insulating layers defining a second aperture of the control element through which charged droplets pass after passing through the aperture of the sensor element, wherein the conductive control layer is a second segmented conductive layer having a second plurality of divided segments electrically independent from one another and arranged about a perimeter of the second aperture; and
   a voltage controller electrically coupled to each of the second plurality of divided segments, wherein each divided segment of the second plurality of divided segments is positioned to generate an electric field as the charged droplet passes through the second aperture to control a trajectory of the charged droplet, the voltage controller configured to apply voltages to each of the second plurality of divided segments to generate the electric field.

13. The device of claim 12, further comprising: a processor; and
   a non-transitory computer readable storage medium in data communication with the processor, the non-transitory computer readable storage medium storing processor executable instructions that, when executed by the processor, cause the processor to perform operations including:
   receiving the signals from the circuit element;
   determining a position of a charged droplet based on the signals;
   determining a set of voltages for application to the second plurality of divided segments based on the position of the charged droplet, a velocity of the charged droplet, and/or a predetermined position of a target; and
   controlling the voltage controller to apply the set of voltages to the second plurality of divided segments.

14. A method for detecting or controlling charged droplets from a charged droplet generator, the method comprising:
    directing a charged droplet toward a target and through an aperture of a charged droplet detector;
    measuring a plurality of values proportional to induced currents at the charged droplet detector, wherein the induced currents are generated as the charged droplet passes through the aperture; and
    analyzing the plurality of values proportional to induced currents to determine a position of the charged droplet.

15. The method of claim 14, further comprising determining one or more of:
    an arrival time of the charged droplet at the aperture; a velocity of the charged droplet;
    a charge to volume ratio for the charged droplet; or a presence of one or more charged satellite droplets.

16. The method of claim 14, further comprising determining a total charge of the charged droplet based on the plurality of values.

17. The method of claim 14, wherein analyzing the plurality of values to determine the position of the charged droplet comprises:
    determining a difference between measured values from segments of the charged droplet detector positioned on opposite sides of the aperture of the charged droplet detector; and determining a position along an axis between the segments positioned on opposite sides of the aperture based on the difference between the measured values.

18. The method of claim 14, further comprising reversing a polarity of the charged droplet detector to form a charged droplet gate.

19. The method of claim 14, wherein directing the charged droplet includes directing the charged droplet through a second aperture of a charged droplet controller, and wherein the method further comprises:
  determining a set of voltages for application to the charged droplet controller to control a trajectory of the charged droplet toward the target, wherein the set of voltages is determined based on the position of the charged droplet; and
  applying the set of voltages to the charged droplet controller.

20. A method for adjusting ejection parameters based on monitored charge droplets in an acoustic droplet ejection system, the method comprising:
  applying an acoustic signal to a fluid to cause a first charged droplet to be ejected from a reservoir toward a target through an aperture of a charged droplet detector using an acoustic droplet ejection system coupled to the reservoir;
  determining, based on measurements of values proportional to charged droplet induced currents at the charged droplet detector, that the acoustic signal has caused ejection of a satellite droplet; and
  based on said determining, adjusting parameters of the acoustic droplet ejection system to prevent or reduce ejection of satellite droplets in subsequent ejections.

* * * * *